United States Patent
Shimada et al.

(10) Patent No.: US 7,024,974 B2
(45) Date of Patent: Apr. 11, 2006

(54) VERTICAL MACHINE TOOL WITH A MOVABLE MAIN SPINDLE

(75) Inventors: Takashi Shimada, Nara (JP); Etsuro Shimada, Nara (JP)

(73) Assignee: Mori Seiki Hitech Co., Ltd., Nara (JP)

( * ) Notice: Subject to any disclaimer, the term of this patent is extended or adjusted under 35 U.S.C. 154(b) by 379 days.

(21) Appl. No.: 10/668,184

(22) Filed: Sep. 24, 2003

(65) Prior Publication Data

US 2004/0060402 A1 Apr. 1, 2004

(30) Foreign Application Priority Data

Sep. 26, 2002 (JP) .......................... 2002-280411

(51) Int. Cl.
*B23B 13/00* (2006.01)

(52) U.S. Cl. ............... 82/124; 82/126; 82/127
(58) Field of Classification Search .............. 82/124, 82/125, 126, 127, 142, 158; 29/27 C, 39, 29/40

See application file for complete search history.

(56) References Cited

U.S. PATENT DOCUMENTS

| 4,034,632 A | 7/1977 | Lohner |
| 5,343,789 A | 9/1994 | Richardson |
| 6,055,892 A * | 5/2000 | Otake ............... 82/124 |
| 6,082,016 A * | 7/2000 | Otani et al. ......... 33/642 |
| 6,257,108 B1 * | 7/2001 | Otake ............... 82/1.11 |
| 6,276,245 B1 * | 8/2001 | Yoshino et al. ...... 82/124 |

FOREIGN PATENT DOCUMENTS

| FR | 1480287 | 3/1966 |
| FR | 2220334 | 4/1974 |
| JP | 61-293701 | 12/1986 |
| JP | 11-10407 | 1/1999 |
| JP | 2000-79501 | 3/2000 |
| JP | 2001-341003 | 12/2001 |

* cited by examiner

*Primary Examiner*—Willmon Fridie, Jr.
(74) *Attorney, Agent, or Firm*—Armstrong, Kratz, Quintos, Hanson & Brooks, LLP

(57) ABSTRACT

A vertical lathe is provided with a base, a main spindle, a headstock, a tool rest and a splash guard. The headstock is movable in a Z-axis direction and an X-axis direction and grips a bar workpiece by a chuck. The bar workpiece is machined by moving the headstock and a tool. A part which has been subjected to the machining is cut by a cut-off tool as a machined workpiece. The lathe has a supporting means, provided above the headstock, for supporting an upper end of the bar workpiece and a transfer means for receiving the machined workpiece from the chuck and for transferring the machined workpiece to an outside of a machining area.

17 Claims, 14 Drawing Sheets

VERTICAL MACHINE TOOL WITH A MOVABLE MAIN SPINDLE

BACKGROUND OF THE INVENTION

1. Field of the Invention

The present invention relates to a vertical machine tool with a movable main spindle. An axis of the main spindle is directed substantially vertically to a floor surface and a headstock is movable in parallel with the axis of the main spindle. More particularly, the present invention relates to the machine tool which may perform a so-called bar feed machining in which a bar workpiece (bar work) inserted into the main spindle is repeatedly projected by a predetermined amount, is machined into a predetermined shape, is cut by a cut-off tool or a parting tool and is caused to move outside the machine tool.

2. Description of the Related Art

In many cases in a lathe with an axis of a main spindle being directed in a horizontal direction, a bar feed machining is performed. In this bar feed machining, a bar workpiece (bar member or bar work) with an axial dimension longer than a radial dimension is fed by a bar feed device and simultaneously therewith, the bar workpiece which has been subjected to the turning is cut off by a cut-off tool or the like.

However, there is a vertical machine tool, with a movable main spindle, in which a headstock is movable at least in a first direction (Z-axis direction) in parallel with an axis of the main spindle. The bar feed machining by this machine tool has many issues to be technically solved because the main spindle and the bar workpiece are directed substantially vertically to the floor surface.

Therefore, a technical approach relating a bar workpiece feed device or the like for the vertical machine tool with the movable main spindle has been proposed by, for example, Japanese Patent Laid-Open Application (Publication No. P2000-79501). This publication discloses a technology relating a bar workpiece feed device for inserting a bar workpiece from a direction of the chuck by the operation for moving the bar workpiece in a Z-axis direction (a direction in parallel with the axis of the main spindle) and by the operation for driving and raising the bar workpiece by a driver.

In case of the machine tool, with the movable main spindle, having a headstock moving in a direction (Z-axis direction) in parallel with the axis of the main spindle, the headstock on which a cut-off tool is fixed does not move in the Z-axis direction in many cases. Also, in order to prevent the generation of rattle, it is usually preferable to perform the cut-off machining by the cut-off tool in a position near to the chuck as much as possible. Further, it is preferable that a structure and an operation of a bucket for receiving the cut workpiece are simple.

FIG. 14A and FIG. 14B are illustrations of the operation for cutting the bar workpiece 6 by a conventional vertical machine tool 200 with a movable main spindle.

As shown in FIG. 14A and FIG. 14B, in case of the machine tool 200, a headstock 202 moves up and down relative to a cut-off tool 201. Then, an axial dimension of the machined workpiece 6a is set at predetermined dimensions "L1" and "L2".

The bar workpiece 6 is cut by the cut-off tool 201 so that the cut workpiece 6a is received in a bucket 203. In this case, the shorter the distance "h1" and "h2" between a lower end of the machined workpiece 6a and a bottom surface of the bucket 203, the less the damage will become and the better the operation for receiving the workpiece 6a will become when the machined workpiece 6a drops.

On the other hand, the bar workpiece 6 inserted into the main spindle is gripped at one end by the chuck (or collet chuck). However, unless another position away from the chuck at a predetermined distance is held, the bar workpiece 6 makes a so-called gyro motion due to the rotation of the main spindle to generate vibration and to cause the degradation in precision.

Accordingly, in the lathe of which the main spindle is directed horizontally, the gyro motion is prevented by inserting a filler tube into the main spindle.

There is a machine tool having a structure in which a bucket 203 shown in FIG. 14A and FIG. 14B only makes a swinging motion between a receiving position, at which the machined workpiece 6a is received, and a discharging position, from which the machined workpiece 6a is discharged, thereby moving the machined workpiece 6a. In this case, a level of the bucket 203 in the receiving position is always kept constant.

Therefore, as shown in FIG. 14A, in order to make suitable a distance "h1" between a lower end of the machined workpiece 6a and a bottom surface of the bucket 203, a height of the bucket 203 is set by setting an axial dimension of the machined workpiece 6a in conformity with the maximum length "L1". However, if such a setting is taken, in case of the machined workpiece 6a having a short axial dimension "L2" as shown in FIG. 14B, a distance "h2" between the lower end of the machined workpiece 6a and the bottom surface of the bucket 203 is increased.

Thus, if the distance "h2" is long, there is a fear that the machined workpiece 6a would be damaged when the machined workpiece 6a drops down to the bucket 203. Therefore, there is a demand that this point should be solved.

Japanese Patent Laid-Open Application (Publication No. 11-10407) discloses a workpiece discharge device. A machine tool provided with this workpiece discharge device is a lathe in which an axis of a main spindle is directed in a horizontal direction.

In the workpiece discharge device described in the patent publication (No. 11-10407), a preparation position in which the machined workpiece cut away from a bar member is received in the bucket for the workpiece is adjustable, accordingly the construction becomes complicated.

Also, if the adjustable range is to be increased, when the bucket is swung to the front cover covering the front side of the machining area, the bucket is not identified with the position of a discharge chute formed in a front cover. As a result, there is a fear that the machined workpiece might not be smoothly transferred from the bucket to the chute, so that the adjustable range could not be increased.

On the other hand, in the case where a diameter of the workpiece is changed, filler tubes for preventing the gyro motion of the workpiece should be replaced for setup. However, in the vertical machine tool with the movable main spindle, it is very troublesome to perform the setup change of the filler tubes and the like.

It is therefore expected to provide a vertical machine tool, with a movable main spindle, which may perform the bar feed machining while preventing the gyro motion of the bar workpiece without setup changing operation such as the filler tube changing operation.

In some cases, the bar feed device is attached to a lathe in which the axis of the main spindle is directed in the horizontal direction. In those cases, the bar feed device having the installation area corresponding to the length of the bar workpiece should be arranged on a rear portion of the main spindle. Therefore, there is a problem that the installation area of the lathe would be considerably increased.

SUMMARY OF THE INVENTION

In order to overcome the above-described defects, an object of the present invention is to provide a vertical machine tool with a movable main spindle in which the bar feed machining for continuously machining bar workpiece may be performed and change of kinds of the bar workpiece may be performed by simple setup changing operation without any hit damage or flaw left on the machined workpiece, any machining precision fault or any vibration of the machine tool.

Also, another object of the present invention is to provide a vertical machine tool with a movable main spindle in which the bar feed machining may be performed and an installation space for the machine tool may be saved.

In order to attain the above-described objects, according to the present invention, there is provided a vertical machine tool with a movable main spindle comprising: a base of the machine tool; the main spindle having an axis directed vertically to a floor surface and provided at a tip end with a chuck; a headstock, being movable at least in a first direction in parallel with the axis of the main spindle, for rotatably supporting the main spindle; a tool rest provided on the base and on which a single or a plurality of tools is mounted; and a splash guard, provided on the base, for covering a machining area of the machine tool, wherein the headstock or the tool rest is relatively movable in a second direction perpendicular to the first direction, one end of a bar workpiece, having a longer axial dimension than a radial dimension and kept to project at a predetermined length under the condition that the bar workpiece is inserted into the main spindle, is gripped by the chuck, the headstock and the tool of the tool rest move relative to each other to machine the bar workpiece into a predetermined shape, and a part which has been subjected to the machining is cut off as a machined workpiece in a predetermined position by a cut-off tool, and wherein the machine tool further comprises: a bar workpiece supporting means, provided above the headstock, for supporting the other end of the bar workpiece inserted into the main spindle, and a workpiece transfer means provided on the base and receiving the machined workpiece, which has been subjected to the cutting machining, from the chuck and transferring the machined workpiece to an outside of the machining area of the machine tool.

There is provided another vertical machine tool with a movable main spindle comprising: a base of the machine tool; the main spindle having an axis directed vertically to a floor surface and provided at a tip end with a chuck; a headstock, being movable at least in a first direction in parallel with the axis of the main spindle, for rotatably supporting the main spindle; a tool rest provided on the base and on which a single or a plurality of tools is mounted; and a splash guard, provided on the base, for covering a machining area of the machine tool, wherein the headstock or the tool rest is relatively movable in a second direction perpendicular to the first direction, a bar workpiece, having a longer axial dimension than a radial dimension and being kept to project at a predetermined length under the condition that the bar workpiece is inserted into the main spindle, is gripped by the chuck, the headstock and the tool of the tool rest move relative to each other to machine the bar workpiece into a predetermined shape, and a part which has been subjected to the machining is cut off as a machined workpiece in a predetermined position by a cut-off tool, and wherein the machine tool further comprises: a cut-off tool holding means, mounted on or changeably provided on the tool rest and holding the cut-off tool, for adjusting a position of the cut-off tool in the first direction for cutting the bar workpiece; a discharge port, provided in the splash guard, for discharging the machined workpiece to the outside of the machining area; and a workpiece transfer means, provided on the base and provided with a workpiece receiving member for receiving the machined workpiece from the chuck, for moving the workpiece receiving member to a receiving position for receiving from the chuck the machined workpiece having been cut off by the cut-off tool and to a discharging position corresponding to the discharge port, wherein the position of the cut-off tool in the first direction is adjustable by the cut-off tool holding means, so that a distance between a lower end of the bar workpiece and a bottom surface of the workpiece receiving member is kept in a predetermined dimensional range when the workpiece receiving member is located at the receiving position and the cut-off tool is cutting the bar workpiece.

Preferably, a collecting box which collects the machined workpiece discharged from the discharge port is provided in a position outside of the splash guard corresponding to a position of the discharge port.

Preferably, the splash guard has an opening portion and an opening and closing door for shielding the opening portion and the discharge port is provided in the opening and closing door.

The collecting box comprises: an upper cover fixed on a front surface of the opening and closing door of the splash guard, a collecting box receiving portion movably provided on the base through a guide portion, and a collecting portion received detachably in the collecting box receiving portion.

Preferably, an oil pan for receiving cutting fluid collected in the collecting box receiving portion is arranged to extend longitudinally in the second direction below the collecting box receiving portion, the oil pan has a dimension longer than a moving range of the collecting box receiving portion and is fixed on the base, and the cutting fluid within the collecting box receiving portion is collected in the oil pan even if the collecting box receiving portion is moved in any position in the second direction.

Preferably, the workpiece receiving member is a bucket, the bucket is driven to be swingable by a rotary actuator and moves between the receiving position and the discharging position, the bucket is rotatably supported by a bucket supporting member making a swinging motion so that an opening portion of the bucket is directed upwardly at the receiving position, the bucket receives from the chuck the machined workpiece which has been subjected to the cutting machining at the receiving position while the bar workpiece gripped by the chuck is cut off by the cut-off tool, and the bucket is retracted to the discharging position during the turning by the tool, the bucket closes the discharge port at the discharging position, and the machined workpiece received in the bucket is discharged outside of the machining area through the discharge port.

Preferably, the bucket has a predetermined shape such that the bottom surface is narrow and the opening portion is wide, a cam follower is provided to the bottom surface, the bucket is retained with the bottom surface located down and with the opening portion directed upwardly by the gravitational force at the receiving position, and at the discharging position, the cam follower is engaged with a slanted surface portion of a cam member fixed to the splash guard, and the bucket is slanted round a pivot of a supporting shaft, so that an edge portion forming the opening portion of the bucket closes the discharge port to thereby shield the machining area from the outside.

The cut-off tool holding means comprises: a base member mounted detachably on a tool mounting portion of the tool rest or being changeable, a holder member, mounted on the base member, for holding the cut-off tool and for adjusting a position in the first direction of the cut-off tool, and a rotation limiting means, provided between the base member and the holder member, for preventing the holder member from rotating about its axis.

Preferably, the base member is fixed detachably on a turret of the tool rest, a hole having a circular cross-section is formed to penetrate the base member, a key groove is formed to penetrate in the hole in parallel with the axis of the holder member, a cylindrical fitting portion is formed on the holder member, a key provided on the fitting portion is fitted with the key groove movably in the first direction, and the key groove and the key form the rotation limiting means.

Preferably, a fixing means for fixing the holder member to a desired position in the first direction is provided to the base member and on the holder member, the fixing means is composed of a single or a plurality of setscrews engaged with the base member and a fitted portion formed on the fitting portion and depressed by the setscrews, and the setscrews are arranged in predetermined upper and lower positions and are engaged with internal screws formed to the base member so that the setscrews are easily fastened and loosened.

Preferably, a nozzle for discharging cutting fluid in the vicinity of a tool nose portion of the cut-off tool is provided on the holder member, and a supply path for supplying the cutting fluid to the nozzle is formed in the holder member and the base member.

The bar workpiece supporting means comprises: a workpiece supporting body provided on the headstock; and a contact member provided movably in the first direction relative to the workpiece supporting body and provided at its lower end with a recess portion engaging with the other end of the bar workpiece inserted into the main spindle, wherein the contact member always depresses the bar workpiece by a gravitational force of the contact member and supports the bar workpiece.

Preferably, the bar workpiece is rotated about the axis of the main spindle under the both end supported condition in which a lower portion of the bar workpiece is gripped by the chuck and an upper portion of the bar workpiece is always supported by the contact member.

Preferably, the contact member has a rotary portion having the recess portion formed at a lower end thereof, and a non-rotatable portion arranged above the rotary portion and coupled with the rotary portion, a bearing portion is provided between the rotary portion and the non-rotatable portion, and the contact member as a whole is movable in the first direction and only the rotary portion is rotatable together with the bar workpiece.

The bar workpiece supporting means comprises: a workpiece supporting body provided on the headstock; a contact member provided movably in the first direction relative to the workpiece supporting body and provided at its lower end with a recess portion engaging with the other end of the bar workpiece inserted into the main spindle; and a driver for driving the contact member, wherein the bar workpiece is always depressed by the contact member, which is driven by the driver, and the bar workpiece is supported. Preferably, the headstock is also movable in the second direction.

According to the present invention with such a construction, in the vertical machine tool with the movable main spindle, the bar workpiece is inserted into the main spindle, the workpiece is positioned in the axial direction in order and thereafter the bar feed machining for repeating the turning and the cut-off machining is possible.

Also, it is possible to save the installation area of the vertical machine tool with the movable main spindle which may perform the bar feed machining.

BRIEF DESCRIPTION OF THE DRAWINGS

FIGS. 1 to 13 are views showing an example of an embodiment of the present invention. FIG. 1 is a frontal view showing a vertical lathe with a movable main spindle.

FIG. 2 is a partial frontal view of the vertical lathe shown in FIG. 1 in which a splash guard has been removed.

FIG. 3 is a partial frontal view of the vertical lathe shown in FIG. 1 with the splash guard.

FIG. 4 is a left side cross-sectional view of FIG. 3.

FIG. 5 is a frontal view showing a cut-off tool retaining means.

FIG. 6 is a plan view showing the cut-off tool retaining means.

FIG. 7 is a cross-sectional view taken along the line VII—VII of FIG. 5.

FIG. 8 is a cross-sectional view taken along the line VIII—VIII of FIG. 5.

FIG. 10 is a frontal cross-sectional view showing a bar workpiece supporting means.

FIG. 11 is a plan view of the bar workpiece supporting means.

FIG. 12 is a partial enlarged view of a part "A" of FIG. 10.

FIG. 13 is a frontal cross-sectional view of a bar workpiece supporting means according to a modification of the embodiment.

DESCRIPTION OF THE PREFERRED EMBODIMENTS

Figure 1:
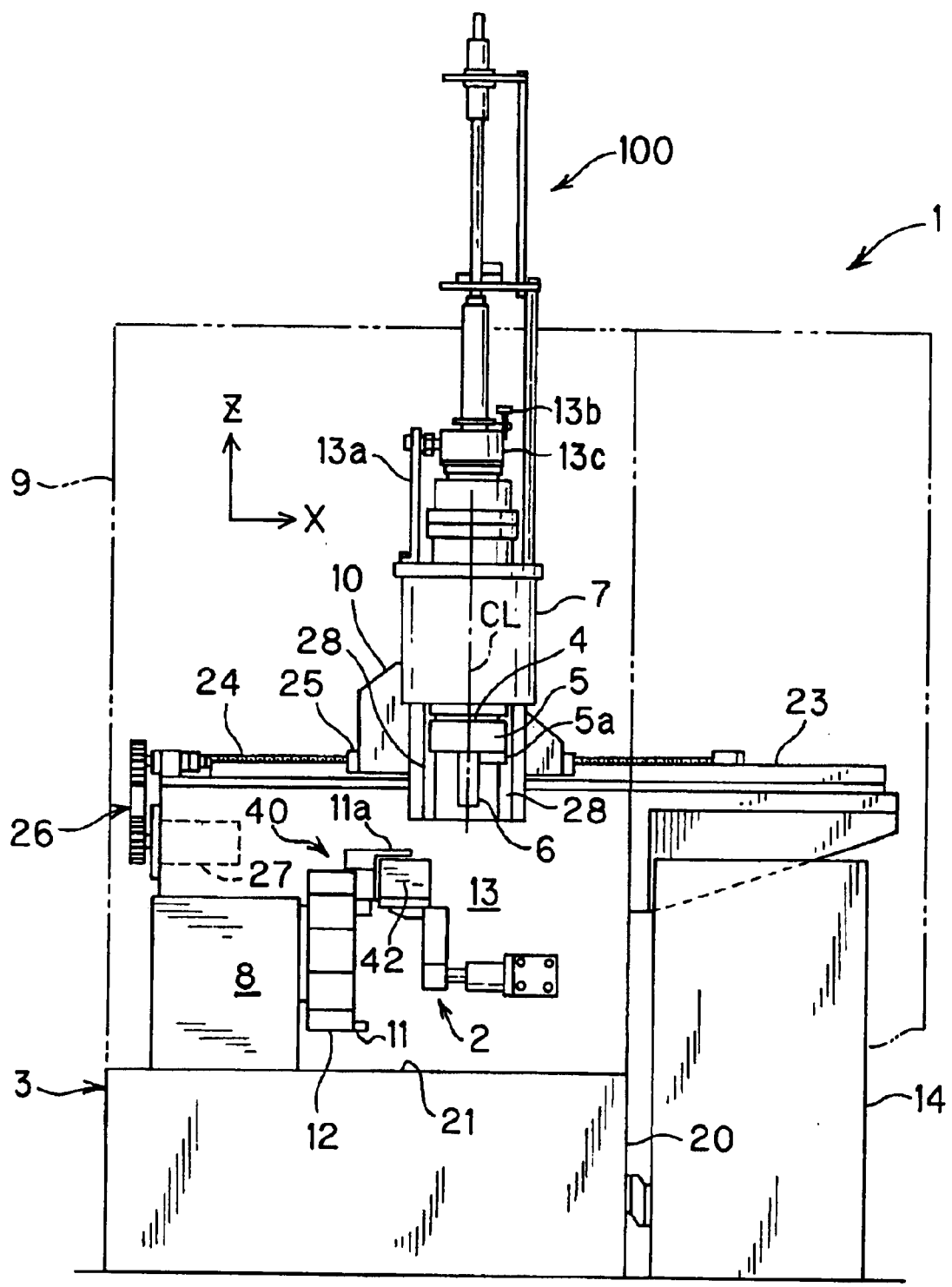

An embodiment of the present invention will now be described with reference to FIGS. 1 to 13.

A vertical machine tool with a movable main spindle according to this embodiment is a machine tool which may perform at least turning and cut-off machining of a bar workpiece. The vertical machine tool is controlled by a controlling unit composed of an NC (Numerical Control) device and a programmable logic controller (PLC). Incidentally, the controlling unit may incorporate a PLC portion in the NC device.

In this case, an axis of the main spindle of the machine tool is directed in a vertical direction to a floor surface. Incidentally, the axis of the main spindle may be directed obliquely at a predetermined angle (also, in which the axis is directed substantially vertical to the floor surface) to the vertical direction.

In the vertical machine tool with the movable main spindle, a headstock for rotatably supporting the main spindle may move at least in a first direction in parallel with the axial direction of the main spindle. The headstock or a tool rest may relatively move in a second direction perpendicular to the first direction. The headstock may move also in the second direction in this embodiment but the tool rest may move in the second direction instead of the headstock.

The headstock and tools of the tool rest move relative to each other in the first direction and in the second direction. As a result, the bar workpiece is turned into a predetermined shape in a machining range, and then a portion which has been subjected to the turning is cut off as a machined workpiece in a predetermined position by a cut-off tool.

In this embodiment, a vertical lathe is exemplified and described as the vertical machine tool with the movable main spindle. A chuck is provided at a tip end of the main spindle of the vertical lathe. The bar workpiece which is inserted into the main spindle and is projected through a predetermined length is gripped by the chuck. The vertical lathe is one of the vertical machine tool, with the movable main spindle, in which the axis of the main spindle is directed substantially in the vertical direction to the floor surface.

Incidentally, the vertical machine tool with the movable main spindle according to the present invention may be a turning center or a grinding machine tool having such a structure in which the headstock is movable at least in the first direction and the headstock or the tool rest may move relative to each other in the second direction. Also, it may be such a machine tool in which the headstock and the tool rest move relatively in three-mutually transverse axes directions.

For example, there are two kinds of machining methods in a machine tool. In one machining method, a bar workpiece (bar member or bar work having an axial dimension of, for example, 2 m to 4 m) having a longer axial dimension than its radial dimension is fed. After the machining such as turning the workpiece has been finished, the portion which has been subjected to the turning is cut off by a cut-off tool or the like and is collected as the machined workpiece. In the other machining method, after a non-machined material (chuck work) is fed and turned, the workpiece is discharged as a machined workpiece.

The vertical lathe, according to this embodiment, which may machine the chuck work in addition to the bar workpiece but the present invention may be applied to the machine tool specialized only for the bar workpiece.

The vertical lathe with the movable main spindle (vertical machine tool with the movable main spindle) will first be described.

Figure 2:
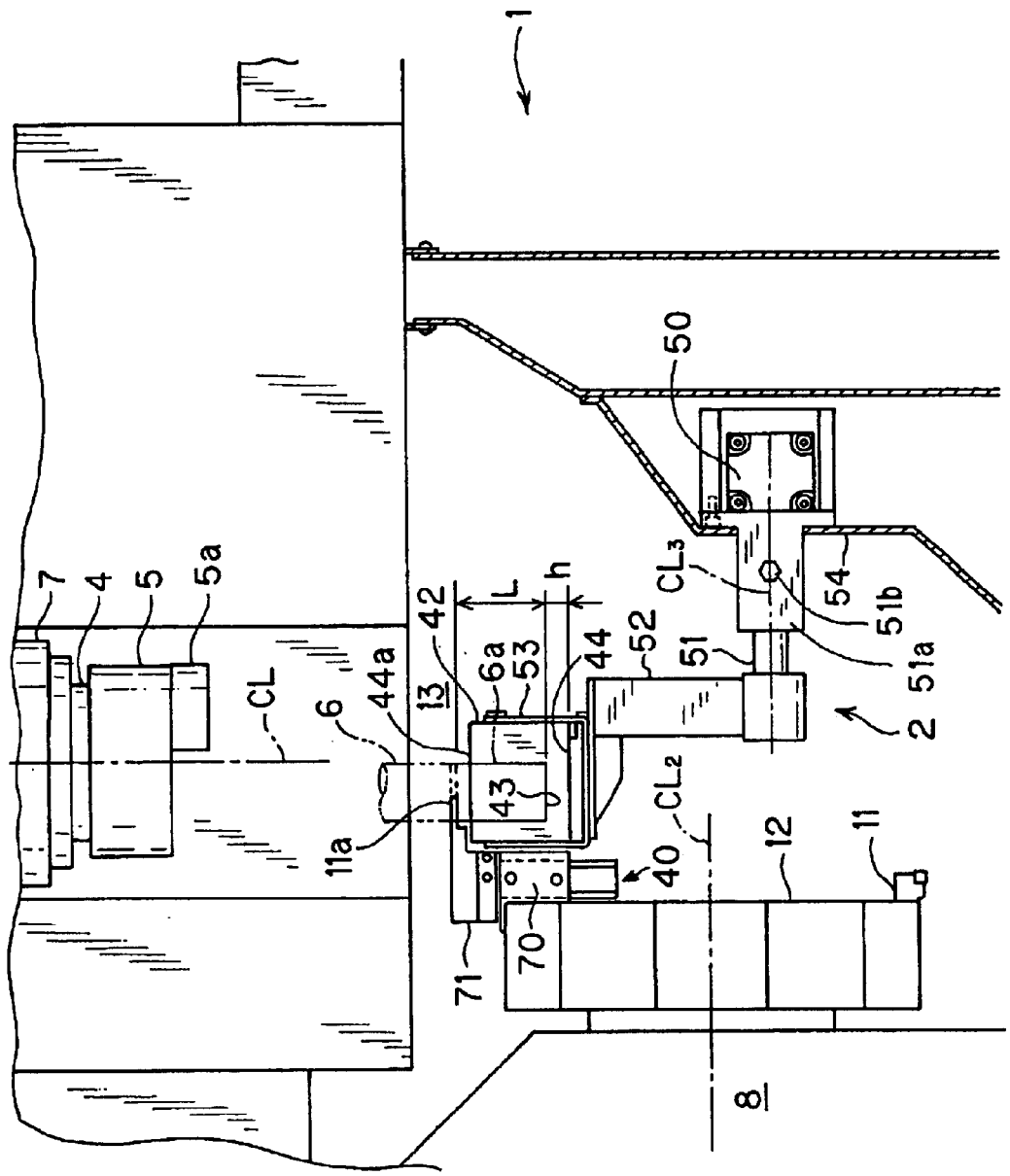
Figure 3:
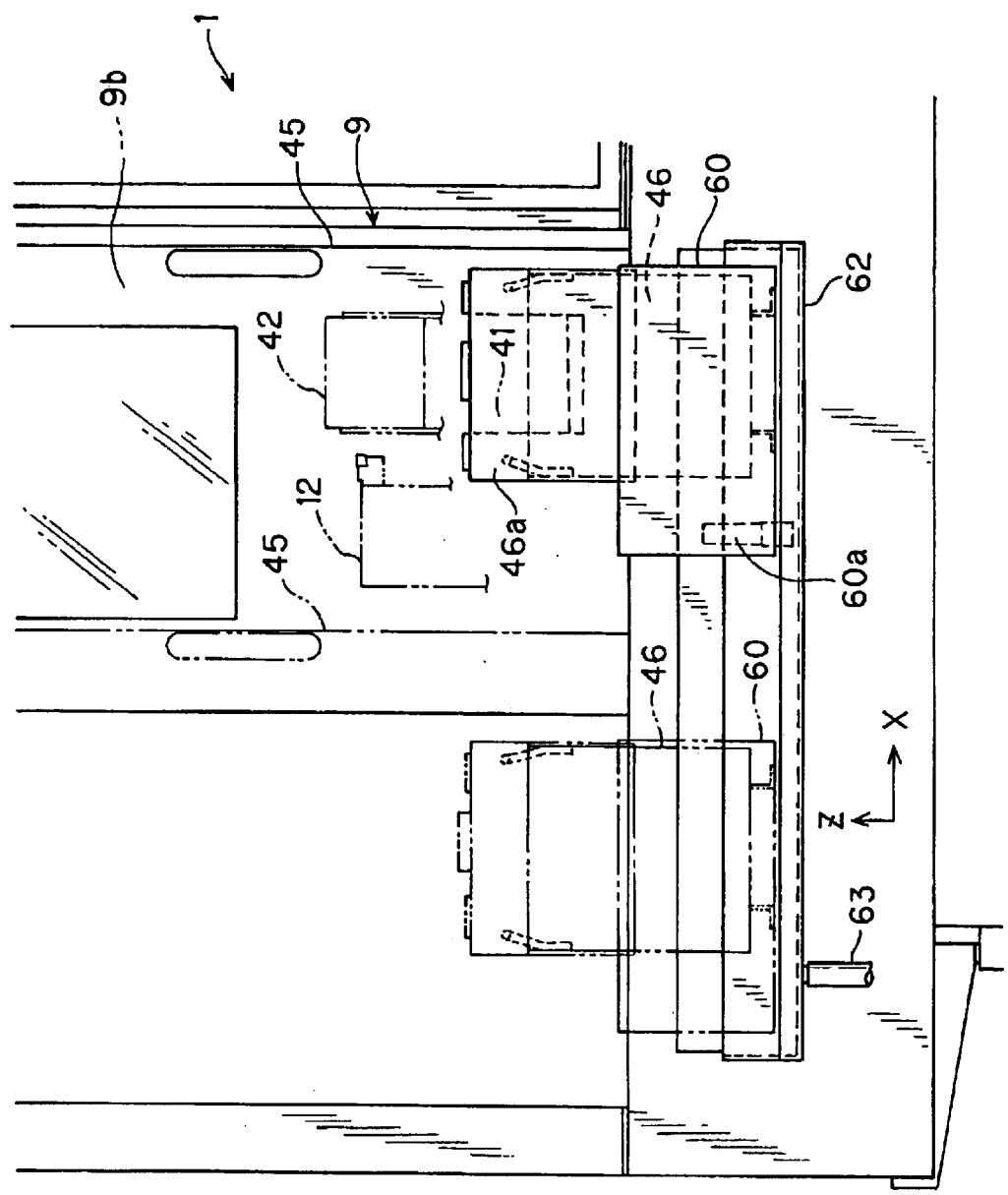
Figure 4:
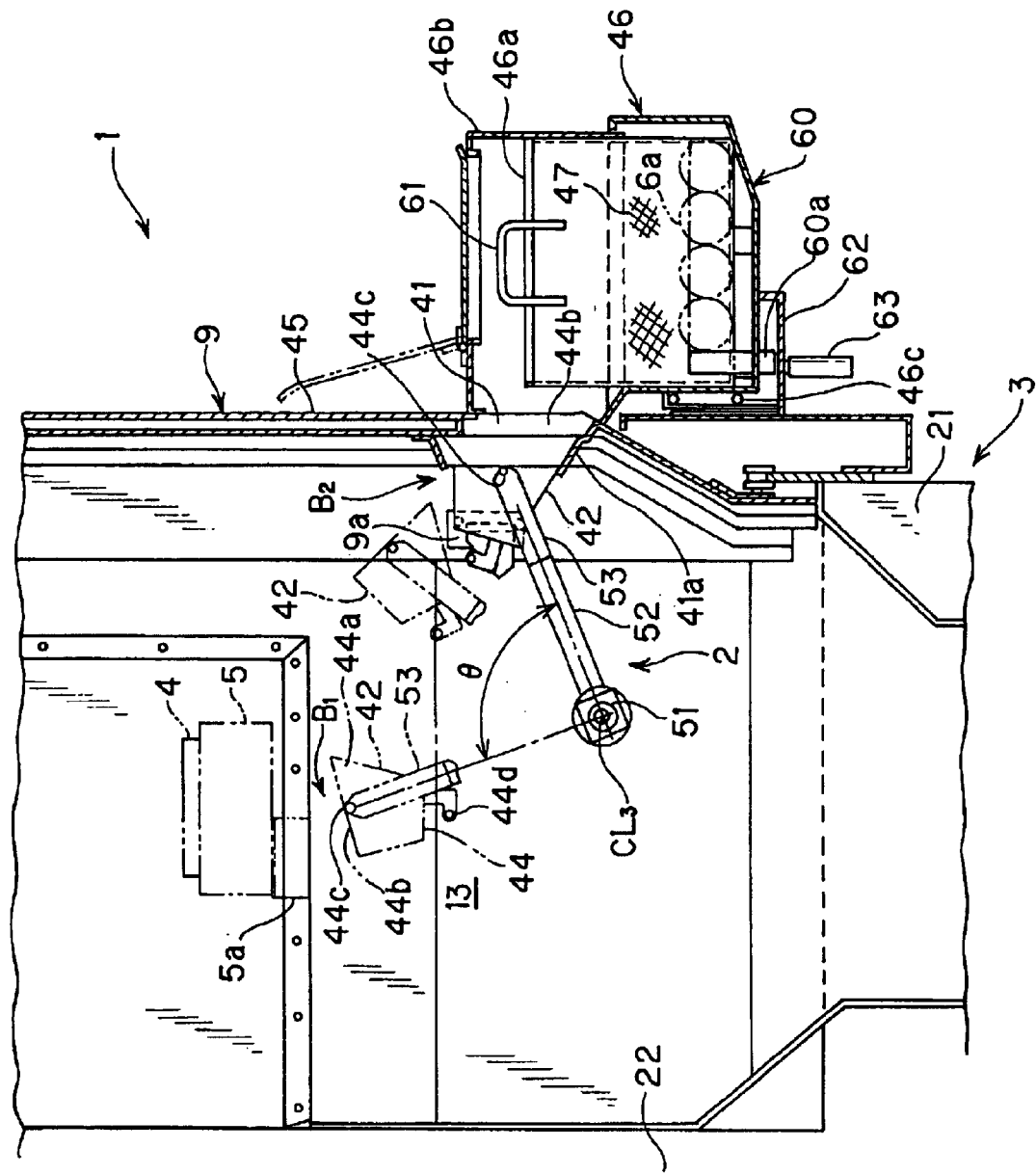

FIGS. 1 to 13 are views showing one example of the embodiment of the present invention. FIG. 1 is a frontal view showing the vertical lathe with the movable main spindle. FIG. 2 is a partial frontal view of the vertical lathe shown in FIG. 1 from which a splash guard has been removed. FIG. 3 is a partial frontal view of the vertical lathe shown in FIG. 1 with the splash guard. FIG. 4 is a left side cross-sectional view of FIG. 3.

As shown in FIGS. 1 to 4, a workpiece receiving member transfer means 2 (hereinafter referred to as a transfer means 2) as a workpiece transfer means and a workpiece feeding unit 14 (hereinafter referred to as a feed unit 14) are provided in the vertical lathe 1 having a base 3. The lathe 1, the transfer means 2 and the feed unit 14 are controlled by a controlling unit.

The feed unit 14 is provided in the vicinity of the base 3 with the bar workpiece receiving position being set in a predetermined position. The feed unit 14 feeds a bar workpiece (bar member or bar work) 6 from the direction of hollow chuck 5 provided at a tip end (lower end portion) of a main spindle 4 at the bar workpiece receiving position.

Then, the feed unit 14 inserts the bar workpiece 6 into hollow holes of the chuck 5, the main spindle 4 and the like. The insertion operation may be performed by the operation of moving of a headstock 7 in the first direction (Z-axis direction) of the headstock 7 or by the operation of raising the bar workpiece 6 by a driver (for example, cylinder) and the like.

The lathe 1 is provided with the base 3, the main spindle 4, the headstock 7, a tool rest 8, a splash guard 9 and the like.

The headstock 7 rotatably supports the main spindle 4. An axis CL of the main spindle 4 is directed vertically to the floor surface. A saddle 10 movably supports the headstock 7 in the Z-axis direction (first direction) in parallel with the axis CL of the main spindle 4 and moves in an X-axis direction (second direction) perpendicular to the Z-axis direction. Accordingly, the headstock 7 is movable in the Z-axis direction and the X-axis direction.

The tool rest 8 has a drive motor for indexing and is provided on the base 3 and is detachable with a single or a plurality of tools 11. A turret 12 for mounting the tools 11 is provided on the tool rest 8 and is rotatably indexed around the center of the axis CL2 in parallel with a predetermine direction (for example, X-axis direction).

A cut-off tool 11a for cutting off the bar workpiece 6 is provided on the turret 12 in addition to the tools (inside diameter tool, outside diameter tool and the like) 11 for turning and cutting the bar workpiece 6 into a predetermined shape. The cut-off tool 11a is detachably mounted on one predetermine surface of the turret 12.

In such a type of the lathe 1 with the movable main spindle described in this embodiment, the headstock 7 moves in the X-axis direction in addition to the Z-axis direction and the tool rest 8 does not move.

Incidentally, the present invention may be applied to such a type of a vertical machine tool, with a movable main spindle, in which a headstock moves only in the Z-axis direction and a tool rest moves in the X-axis direction. In this case, the tool rest moves in the X-axis direction relative to the headstock.

The lathe 1 has a machining area 13 for turning and cutting the bar workpiece 6 gripped by the chuck 5 of the main spindle 4. In the machining area 13, the bar workpiece 6 gripped by the chuck 5 is rotated at predetermined rotational speeds.

The bar workpiece 6 kept inserted into the main spindle 4 and kept to project at a predetermined length is gripped by the chuck 5. The headstock 7 and the tool 11 of the tool rest 8 move relative to each other in the Z-axis direction and the X-axis direction to thereby turn the bar workpiece 6 into a predetermined shape. Then, a part which has been subjected to the turning is cut as a machined workpiece 6a in a predetermined position by the cut-off tool 11a.

A center of the main spindle 4 moves along and on a movement locus in parallel with the X-axis direction and moves between a position (machining position) at which the turning and cutting machining has been performed within the machining area 13 and a bar workpiece receiving position which is set in the feed unit 14 outside of the machining area 13.

A bed 20 of the lathe 1 is formed substantially into an L-shape in side view in which a rear portion thereof is higher in level than a front portion thereof located below the machining area 13. The bed 20 has a front bed 21 and a rear bed 22.

The tool rest 8 is mounted on a front surface of the rear bed 22. A pair of parallel X-axis guide rails 23 is provided on a top surface of the rear bed 22 in the X-axis direction. Slide bodies are fixed on the saddle 10.

The X-axis guide rails 23 and the slide bodies form a linear motion rolling guide. The saddle 10 is arranged movably in the X-axis direction along the X-axis guide rails 23.

A screw shaft 24 of an X-axis ball screw is arranged between the two X-axis guide rails 23 in parallel with the X-axis guide rails 23. A nut 25 fixed to the saddle 10 is threadedly engaged with the screw shaft 24. The screw shaft 24 is rotatably driven in forward and reverse directions by an X-axis servomotor 27 through a transmission mechanism 26 having a toothed pulley, a toothed belt and the like.

When the screw shaft 24 is drivingly rotated by the X-axis servomotor 27, the saddle 10 on which the nut 25 is fixed is reciprocated in the X-axis direction by the guidance and support of the pair of X-axis guide rails 23.

The movement operation of the saddle 10 leads to the movement of the headstock 7 in the X-axis direction relative to the cut-off tool 11a. In this lathe 1, the distance through which the saddle 10 is movable in the X-axis direction is elongated toward the direction of the feed unit 14.

A pair of parallel Z-axis guide rails 28 is provided in the Z-axis direction on a front surface of the saddle 10. Slide bodies are fixed on the headstock 7. The Z-axis guide rails 28 and the slide bodies form a linear motion rolling guide. The headstock 7 is arranged movably in the Z-axis direction along the Z-axis guide rails 28.

A servomotor for the Z-axis is provided on an upper portion of the saddle 10. The servomotor for the Z-axis is adapted to drivingly rotate a screw shaft through a coupling member for coupling an output shaft of the Z-axis servomotor and the screw shaft of the Z-axis ball screw. A nut fixed on the headstock 7 is threadedly engaged with the screw shaft of the Z-axis ball screw.

When the screw shaft is drivingly rotated by the Z-axis servomotor, the headstock 7 on which the nut is fixed moves in the Z-axis direction by the guidance and support of the pair of Z-axis guide rails 28. The movement operation of the headstock 7 leads to the movement of the headstock 7 relative to the tool 11 in the Z-axis direction.

A hollow type chuck cylinder 13c for driving a plurality (for example, three) of jaws 5a of the chuck 5 is provided on an upper portion of the headstock 7. The jaws 5a of the chuck 5 are driven by the chuck cylinder 13c to perform the opening and closing operation and to grip and release the bar workpiece 6.

A rotation limiting member 13a for preventing the chuck cylinder 13c from rotating is provided on the headstock 7 to limit the rotation of a fixed portion of the rotary joint of the chuck cylinder 13c. Reference character 13b denotes a detecting member for detecting whether the jaws 5a of the chuck 5 are under an opening condition or a closing condition.

A built-in type work spindle motor is built in an interior of the headstock 7. The work spindle motor has a stator mounted on the headstock 7 and a rotor mounted on the main spindle 4. The main spindle 4 supported rotatably to the headstock 7 through main bearings is drivingly rotated at predetermined rotational speeds by the work spindle motor under the condition that the bar workpiece 6 is gripped by the chuck 5.

Incidentally, in this embodiment, the linear motion rolling guides are applied to the guide surfaces in the Z-axis direction and in the X-axis direction for the headstock 7 and the saddle 10 but other rolling guides, sliding guides or the like may be applied to the guide surfaces. Also, it is preferable to use the built-in type motor as a spindle motor of the headstock 7 but it is possible to use a motor through a transmission mechanism such as a gear mechanism, a belt and pulley mechanism and the like.

The splash guard 9 has an opening portion 9b and an opening and closing door 45 for shielding the opening portion 9b and is provided on the base 3 to cover the machining area 13. The door 45 may open and close the opening portion 9b.

When the headstock 7 is operated to turn and cut the bar workpiece 6 in the machining area 13, the splash guard 9 prevents splashing articles such as chips, cutting fluid (coolant) and the like in the machining area 13 from splashing to the outside of the machining area 13.

The lathe 1 is provided with a cut-off tool holding means 40 (hereinafter simply referred to as a holding means 40), a discharge port 41, the transfer means 2 and the like. The holding means 40 is mounted on the tool rest 8 (or changeably provided thereon) for holding the cut-off tool 11a. The holding means 40 may adjust the position (height position) of the cut-off tool 11a in the Z-axis direction when the workpiece 6 is cut off by the cut-off tool 11a.

Also, the holding means 40 having the cut-off tool 11a, of which height position has been adjusted to a predetermined position, may be provided detachably. Further, the holding means 40 as a whole may be detachable.

The discharge port 41 is provided, in the opening and closing door 45 of the splash guard 9 (or in the splash guard 9), for discharging the machined workpiece 6a to the outside of the machining area 13.

A chute 41a is provided at the discharge port 41. The chute 41a is mounted on the opening and closing door 45 for smoothly guiding the machined workpiece 6a from a bucket 42, which is the workpiece receiving member, through the discharge port 41 to a collecting box 46.

The workpiece transfer means according to the present invention is provided on the base 3 and has a function for receiving the machined workpiece 6a, which has been subjected to the cutting machining, from the chuck 5 and for transferring the machined workpiece 6a to the outside of the machining area 13 of the lathe 1. The transfer means 2 is provided as the workpiece transfer means in this embodiment.

The transfer means 2 is arranged to face the tool rest 8. The transfer means 2 has the bucket (workpiece receiving member) 42 for receiving a single (in this case) or a plurality of machined workpieces 6a from the chuck 5 and is provided on the base 3.

The bucket 42 is driven to be swingable by a rotary actuator 50. The bucket 42 moves to a receiving position B1 and a discharging position (a predetermined position, i.e., a retracted position in the machining area 13) B2 corresponding to the discharge port 41.

The bucket 42 is supported by a bucket supporting member 53, which makes a swinging motion, and is adapted so that an opening portion 44a of the bucket 42 is directed upwardly at the receiving position B1. Namely, the bucket 42 is rotatably supported in the vicinity of the opening portion 44a by a supporting shaft 44c.

The bucket 42 receives from the chuck 5 the machined workpiece 6a which has been subjected to the cutting machining at the receiving position B1 while the bar workpiece 6 gripped by the chuck 5 is cut off by the cut-off tool 11a.

The bucket 42 is retracted to the discharging position B2 during the turning by the tool 11. At the discharging position B2, the bucket 42 is adapted to close the discharge port 41 for preventing splashing articles such as chips and cutting fluid from splashing to the outside of the machining area 13. The machined workpiece 6a received in the bucket 42 may be discharged to the outside of the machining area 13 through the discharge port 41.

In the lathe 1, the position of the cut-off tool 11a in the Z-axis direction may be adjusted by the holding means 40. Accordingly, when the bucket 42 is located at the receiving position B1 and the cut-off tool 11a is cutting the bar workpiece 6, a distance "h" between a lower end 43 of the bar workpiece 6 and a bottom surface 44 of the bucket 42 is kept in a predetermined dimensional range.

By the way, in some cases, an axial dimension "L" of the machined workpiece 6a is changed when the bar workpiece 6, which has been gripped by the chuck 5 and is subjected to the turning into a predetermined shape, is cut by the cut-off tool 11a and is received by the bucket 42.

In those cases, the distance "h" between the lower end 43 of the machined workpiece 6a and the bucket bottom surface 44 may be kept substantially in the constant small level even if the tool rest 8 does not move in the Z-axis direction (see FIG. 9A and FIG. 9B to be described later).

Therefore, there is no fear that the machined workpiece 6a would contact the bucket 42 even if the axial dimension "L" of the machined workpiece 6a is long. Also, there is no fear that the machined workpiece 6a would be too far from the bucket 42 in the case in which the axial dimension "L" of the machined workpiece 6a is short. Accordingly, the shock happening when the machined workpiece 6a drops down into the bucket 42 may be suppressed, thereby making it possible to prevent any damage from occurring and thereby eliminating the fear that the fault would occur in the product.

The transfer means 2 has the rotary actuator 50, a rotary shaft 51, a pivot supporting member 51a, an arm 52 and the bucket supporting member 53. The rotary actuator 50 is mounted on the base 3. The rotary shaft 51 is driven by the rotary actuator 50 to be rotated at predetermined rotational angles in forward and reverse directions. The pivot supporting member 51a is mounted on the rotary actuator 50 for rotatably supporting the rotary shaft 51 only in rotational direction round an axis of the rotary shaft 51.

The arm 52 is mounted on the rotary shaft 51 and is adapted to swing at a predetermined angle θ about a center axis CL3 of the rotary shaft 51. The bucket supporting member 53 for supporting the bucket 42 is mounted on a tip end portion of the arm 52 and is swingable.

Incidentally, reference character 51b denotes a moving limit member. The moving limit member 51b is provided on the pivot supporting member 51a so that a tip end portion of the moving limit member 51b is engaged with a circumferential groove formed on the rotary shaft 51 to thereby limit the axial movement of the rotary shaft 51.

A partitioning plate 54 is arranged in the machining area 13. The partitioning plate 54 is arranged to face the tool rest 8 and is mounted on the base 3. Slant surfaces are formed on the partitioning plate 54 for guiding the chips and cutting fluid within the machining area 13 downwardly.

The rotary actuator 50 is arranged on the back (on the right side of FIG. 1 and FIG. 2) of the partitioning plate 54 so that the chips and cutting fluid would not directly contact with the rotary actuator 50 to thereby prevent the malfunction or breakdown from occurring. The rotary shaft 51, the arm 52, the bucket supporting member 53 and the bucket 42 are arranged within the machining area 13.

Such a transfer means 2 in which the bucket 42 is transferred between the receiving position B1 and the discharging position B2 by the linear motion or by the motion in combination of the linear motion and the rotational motion may be used.

The bucket 42 has a predetermined shape such that the bottom surface 44 is narrow and an opening portion 44a is wide. A cam follower 44d is provided to the bottom surface 44. At the receiving position B1, the bucket 42 is retained with the bottom surface 44 located down and with the opening portion 44a directed upwardly by a gravitational force.

At the discharging position B2, the cam follower 44d is engaged with a slanted surface portion of a cam member 9a fixed to the splash guard 9 and the bucket 42 is slanted round a pivot of the supporting shaft 44c, so that an edge portion 44b forming the opening portion 44a of the bucket 42 closes the discharge port 41 of the door 45. Thus, the machining area 13 is shielded from the outside of the machining area 13. Also, a side surface of the bucket 42 and the chute 41a are kept substantially in parallel with each other so that the machined workpiece 6a may move smoothly.

The collecting box 46 for collecting the machined workpiece 6a is provided at a position (i.e., a predetermined position outside of the machining area 13) outside of the splash guard 9 corresponding to a position of the discharge port 41. It is thus possible to pick up the machined workpiece 6a from the collecting box 46 even during the turning.

The collecting box 46 is composed of an upper cover 46b fixed on a front surface of the door 45, a collecting box receiving portion 60 (hereinafter referred to as a receiving portion 60) provided movably through a guide portion 46c on the base 3, a collecting portion 46a received detachably in the receiving portion 60 and the like.

Grips 61 for a detaching and attaching work are mounted on the collecting portion 46a. Since a number of holes 47 are penetrated and formed in the collecting portion 46a, it is possible to discharge the cutting fluid through the holes 47 from the collecting box 46.

A pipe 60a is implanted in the receiving portion 60 and the cutting fluid is left up to an upper height position of the pipe 60a in the receiving portion 60. The cutting fluid, exceeding the height of the pipe 60a, which passes through the holes 47 of the collecting box 46 is discharged from the receiving portion 60.

When the door 45 is opened and closed in the X-axis direction, the receiving portion 60 and the collecting portion 46a received in the receiving portion 60 are moved in the X-axis direction together with the door 45 by the upper cover 46b mounted on the door 45.

An oil pan 62 is arranged to extend longitudinally in the X-axis direction below the receiving portion 60 and receives the cutting fluid collected in the receiving portion 60. The oil pan 62 has a dimension longer than the moving range of the receiving portion 60 and is fixed on the base 3.

Even if the receiving portion 60 is moved in any position in the X-axis direction, the cutting fluid within the receiving portion 60 is collected in the oil pan 62. A pipe 63 is connected to the oil pan 62. The cutting fluid collected in the oil pan 62 is caused to flow through the pipe 63 and is collected by a collecting tank (not shown).

The cutting fluid stuck on the machined workpiece 6a and the bucket 42 is collected by the oil pan 62 when the cutting fluid is left more than necessary in the receiving portion 60. Accordingly, even if the door 45 is opened and closed, there is no fear that the cutting fluid would contaminate the floor surface. Also, since the cutting fluid stores in the receiving portion 60, when pluralities of the machined workpiece are collected in order, it is possible to prevent the damage or flaw of the machined workpieces.

The holding means 40 will now be described.

Figure 5:
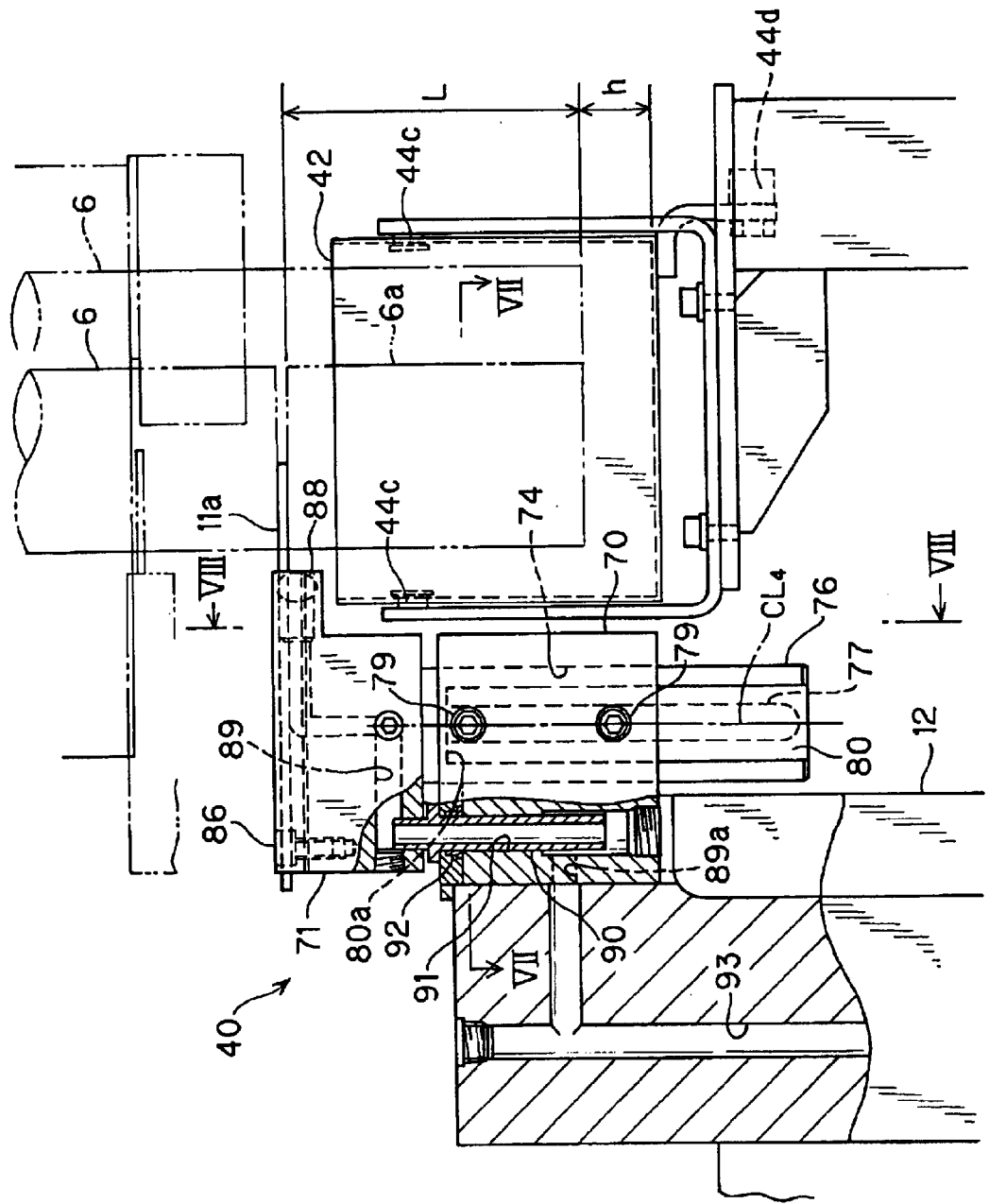
Figure 6:
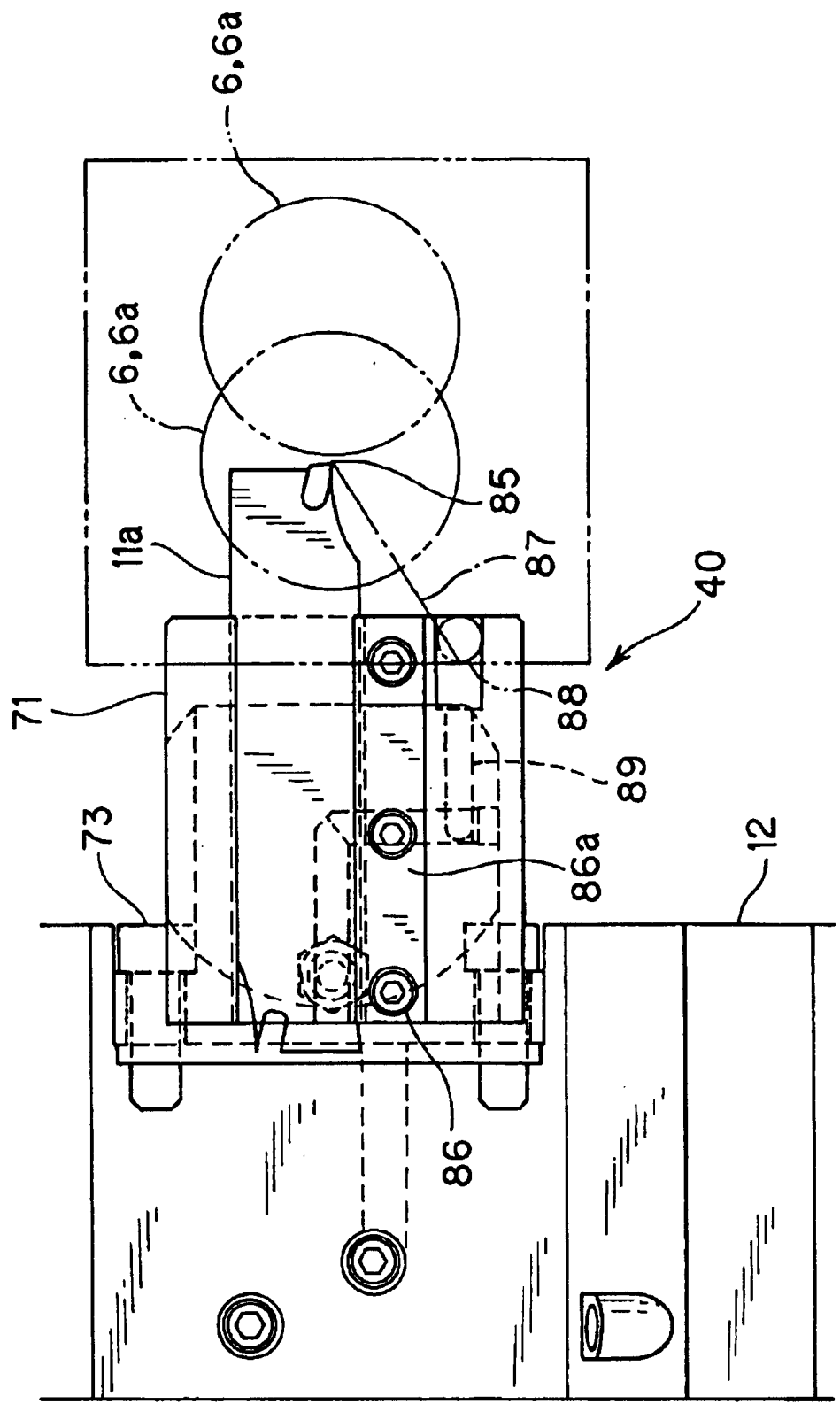
Figure 7:
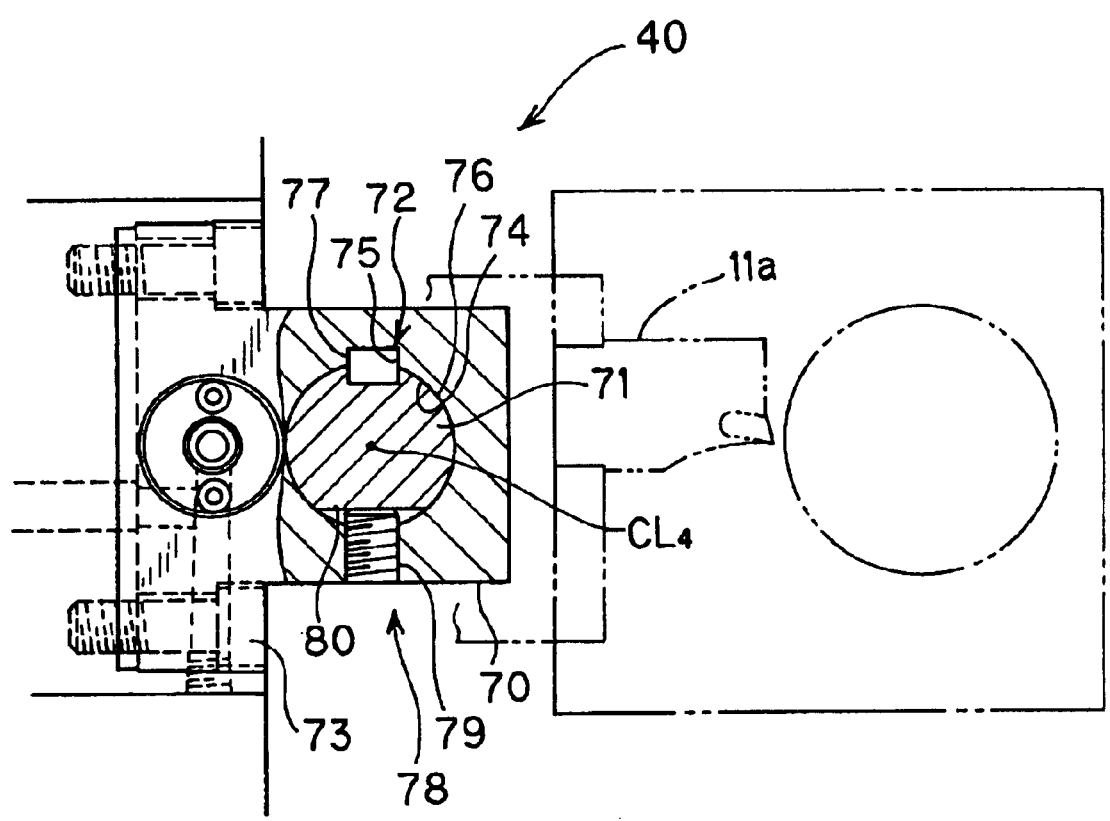
Figure 8:
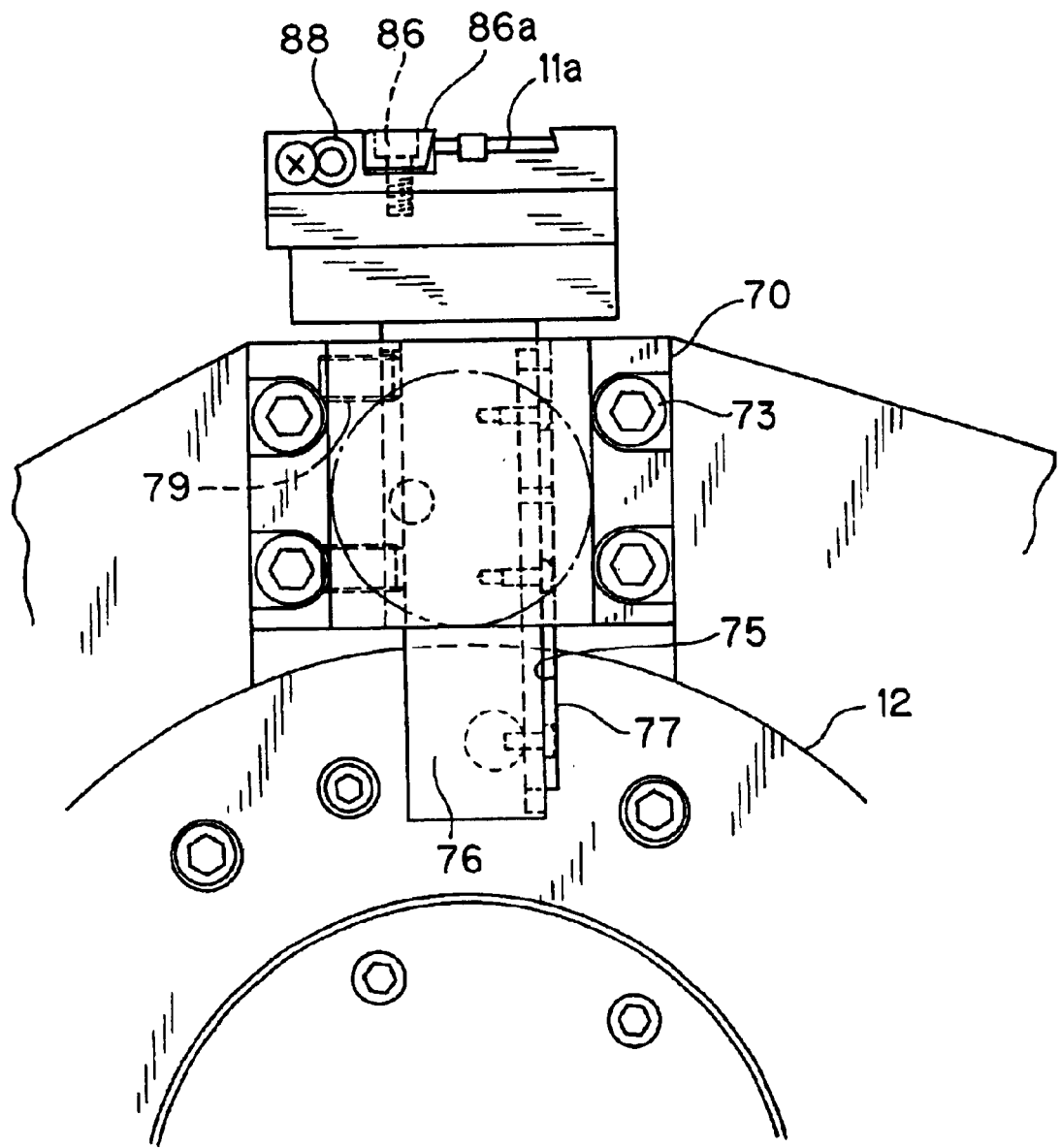

FIGS. 5 to 8 show the holding means 40. FIG. 5 is a frontal view, FIG. 6 is a plan view, FIG. 7 is a cross-sectional view taken along the line VII—VII of FIG. 5 and FIG. 8 is a perspective view from the line VIII—VIII of FIG. 5. FIG. 9A and FIG. 9B are illustrations of the operation when the bar workpiece 6 is to be cut.

As shown in FIG. 2, FIG. 5 and FIG. 8, the holding means 40 has a base member 70 (hereinafter simply referred to as a base 70), a holder member 71 (hereinafter simply referred to as a holder 71), a rotation limiting means 72 and the like.

The base 70 is detachably mounted on a tool mounting portion (i.e., one surface of the turret 12 in this case) of the tool rest 8 or is changeable. The holder 71 is adapted to hold the cut-off tool 11a and is mounted on the base 70 so that the position in the Z-axis direction (i.e., the height position) of the cut-off tool 11a may readily be adjustable.

In this embodiment, the holder 71 is movable to the base 70 in the Z-axis direction. Incidentally, as a modification, it is possible to prepare a plurality of holder members so that the height position of the cut-off tool 11a in the Z-axis direction becomes a desired position corresponding to the length dimension "L" of the machined workpiece 6a and to change the holder members corresponding to the length dimension "L" of the machined workpiece 6a.

Further, as another modification, it is possible to movably engage the holder member with the base member in the Z-axis direction and to perform a control to automatically move the holder member so that the cut-off tool 11a is positioned at a desired height in the Z-axis direction. It is therefore possible to perform the cutting machining in order automatically and to obtain the machined workpieces 6a having different length dimensions.

Also, in case of a machine tool which is of an automatically tool changeable type, it is possible to prepare a plurality kind of holding means 40, which are similar to changeable tools, and to change the holding means 40 by an automatic tool changer (ATC) or the like. This holding means 40 is of the changeable tool type having a shank of an HSK (Hohl Shaft Kegel) tool or a BT tool (7/24 Taper tool) on the base member so that the height position of the cut-off tool 11a becomes a desired position in the Z-axis direction.

A rotation limiting means 72 is provided between the base 70 and the holder 71 to prevent the holder 71 from rotating about the axis CL4 of the holder 71. Because of the provision of the rotation limiting means 72, the cut-off tool 11a is held in the position under the condition that the cut-off tool 11a is directed toward the bar workpiece 6 without any rotation to the base 70.

The base 70 is fixed detachably on the turret 12 by a plurality (four in this case) of bolts 73. A hole 74 having a circular cross-section is formed to penetrate the base 70. A key groove 75 is formed to penetrate in parallel with the axis CL4 in a predetermined position of the hole 74.

A cylindrical fitting portion 76 is formed on the holder 71. A key 77 is provided in parallel with the axis CL4 to the fitting portion 76. The key 77 is movably fitted with the key groove 75 in the Z-axis direction. The key groove 75 and the key 77 are adapted to form the rotation limiting means 72 so that the holder 71 is not rotated about the axis CL4.

A fixing means 78 is provided to the base 70 and on the holder 71 and fixes the holder 71 to a desired position in the Z-axis direction. The fixing means 78 is arranged in an opposite direction, at 180° in plan view with respect to the axis CL4, to the rotation limiting means 72.

The fixing means 78 is composed of a single or a plurality (two in this case) of setscrews 79 screwed on the base 70 and a fitted portion 80 formed on the fitting portion 76 and depressed by the setscrews 79.

The two setscrews 79 are arranged in predetermined upper and lower positions and are engaged with internal screws, formed to penetrate the base 70, so as to be easily fastened and loosened.

The fitted portion 80 is formed in a flat surface to extend in the Z-axis direction in parallel with the axis CL4 and is only closed with a top end portion 80a of the fitted portion 80. It is therefore possible to position and fix the holder 71 at a desired height position to the base 70 by operating the setscrews 79.

Also, the holder 71 may be drawn out of the base 70 upwardly. The downward movement operation of the holder 71 is limited by the engagement of the upper setscrew 79 with the top end portion 80a of the fitted portion 80.

The cut-off tool 11a having a tool nose portion 85 is detachably mounted on the upper surface of the holder 71 through a mounting member 86a by bolts 86. A nozzle 88 for discharging the cutting fluid 87 in the vicinity of the tool nose portion 85 of the cut-off tool 11a is provided on the holder 71. A supply path 89 for supplying the cutting fluid 87 to the nozzle 88 is formed in the holder 71 and the base 70.

The nozzle 88 is provided on the holder 71. It is therefore possible to always supply the cutting fluid 87 by the nozzle 88 to the tool nose portion 85 and to perform the cutting machining well even if the position of the holder 71 to the base 70 in the Z-axis direction changes. A fitting pipe 90 is provided in the holder 71 in parallel with the fitting portion 76 and projects downwardly. An interior of the fitting pipe 90 forms a part of the supply path 89.

A fitted hole 91, with which the fitting pipe 90 fits movably in the Z-axis direction, is formed in the base 70. The hole 91 is formed in the Z-axis direction in parallel with the axis CL4. The hole 91 forms a part of the supply path 89. A supply path 93 formed in the turret 12 is in communication with the hole 91.

A space between the fitting pipe 90 and the hole 91 is sealed by a seal member 92. The seal member 92 is mounted on the base 70 and is arranged on the upper portion of the hole 90.

Therefore, the cutting fluid 87 flows from the outside of the turret 12 through, the supply path 93 within the turret 12, the supply path 89a within the base 70, the hole 91, the fitting pipe 90 and the supply path 89 within the holder 71 in this order. Then, the cutting fluid 87 is discharged to the tool nose portion 85 after it has been supplied to the nozzle 88.

The space between the fitting pipe 90 and the hole 91 is sealed by the seal member 92 even if the holder 71 is moved in the Z-axis direction relative to the base 70 for adjusting the position. Accordingly, there is no fear that the cutting fluid would leak from the space between the fitting pipe 90 and the hole 91. Also, it is possible to always supply the fitting fluid 87 to the nozzle 88 irrespective of the height position of the cut-off tool 11a.

Figure 9A:
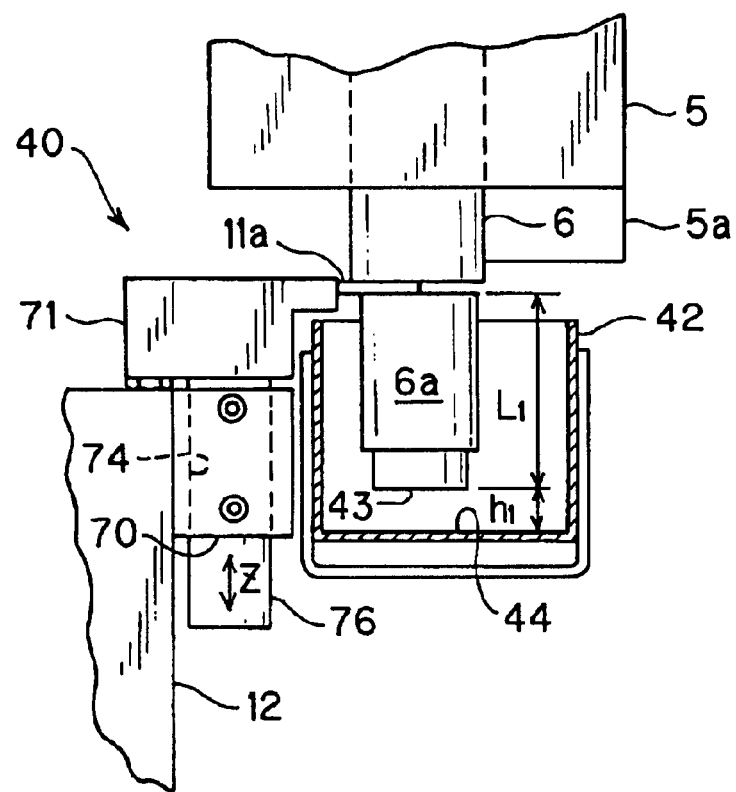
FIG. 9A and FIG. 9B are illustrations of cutting machining of a bar workpiece.

In some cases as shown in FIG. 9A, the bar workpiece 6 is cut by the cut-off tool 11a to obtain the machined workpiece 6a having a short axial dimension "L1". In the setup work in those cases, the holder 71 is positioned and fixed to the base 70 at a predetermined lower position.

When the cutting machining is performed by the cut-off tool 11a, the distance "h1" between the lower end 43 of the bar workpiece 6 and the bottom surface 44 of the bucket 42 is set at a small level within a predetermined dimensional range.

Figure 9B:
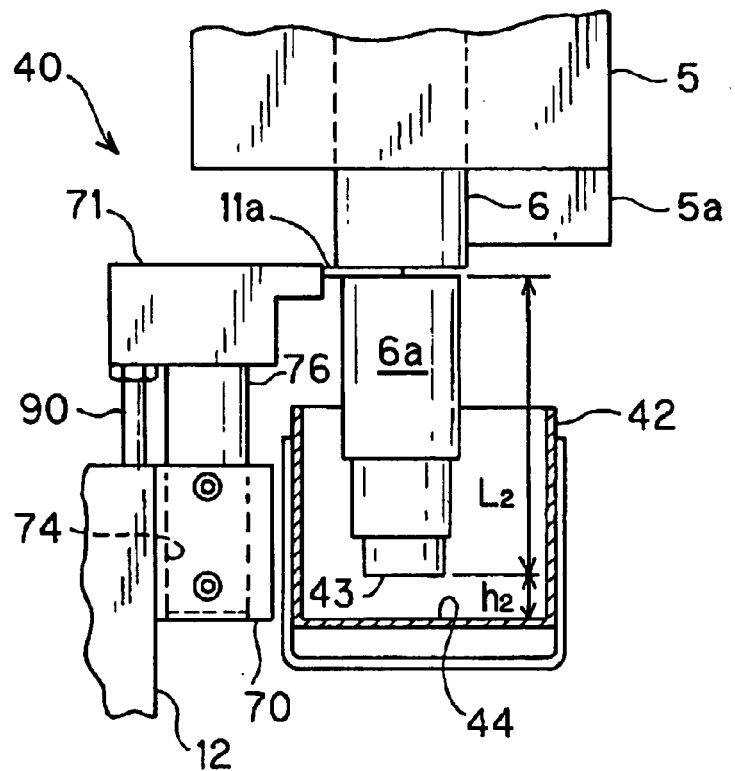

On the other hand, in other cases as shown in FIG. 9B, the bar workpiece 6 is cut by the cut-off tool 11a to obtain the machined workpiece 6a having a long axial dimension "L2". In the setup work in those cases, the holder 72 is moved upwardly in advance, and the position in the Z-axis direction of the cut-off tool 11a is positioned and fixed to the base 70 at a predetermined upper position.

When the cutting machining is performed by the cut-off tool 11a, the distance "h2" between the lower end 43 of the bar workpiece 6 and the bottom surface 44 of the bucket 42 may be set at a small level within a predetermined dimensional range.

It is possible to thus adjust the height position of the cut-off tool 11a by the holding means 40. It is therefore possible to set the distance "h1" and "h2" between the lower end 43 of the bar workpiece 6 and the bottom surface 44 of the bucket 42 within the predetermined dimensional range.

As a result, when the bar workpiece 6, which has been gripped by the chuck 5 and turned and machined into a predetermined shape, is cut off by the cut-off tool 11a and machined workpiece 6a is to be received into the bucket 42, it is possible to receive the machined workpiece 6a positively into the bucket 42 without any damage.

Thus, the continuous machining is effectively performed to obtain a plurality of the machined workpieces 6a having the same shape. Since the cutting machining by the cut-off tool 11a may be always performed as close as possible to the chuck 5, it is possible to prevent the rattle during the cutting machining.

A bar workpiece supporting means 100 (hereinafter simply referred to a supporting means 100) for supporting the other end of the bar workpiece 6 gripped at one end by the chuck 5 will now be described.

Figure 10:
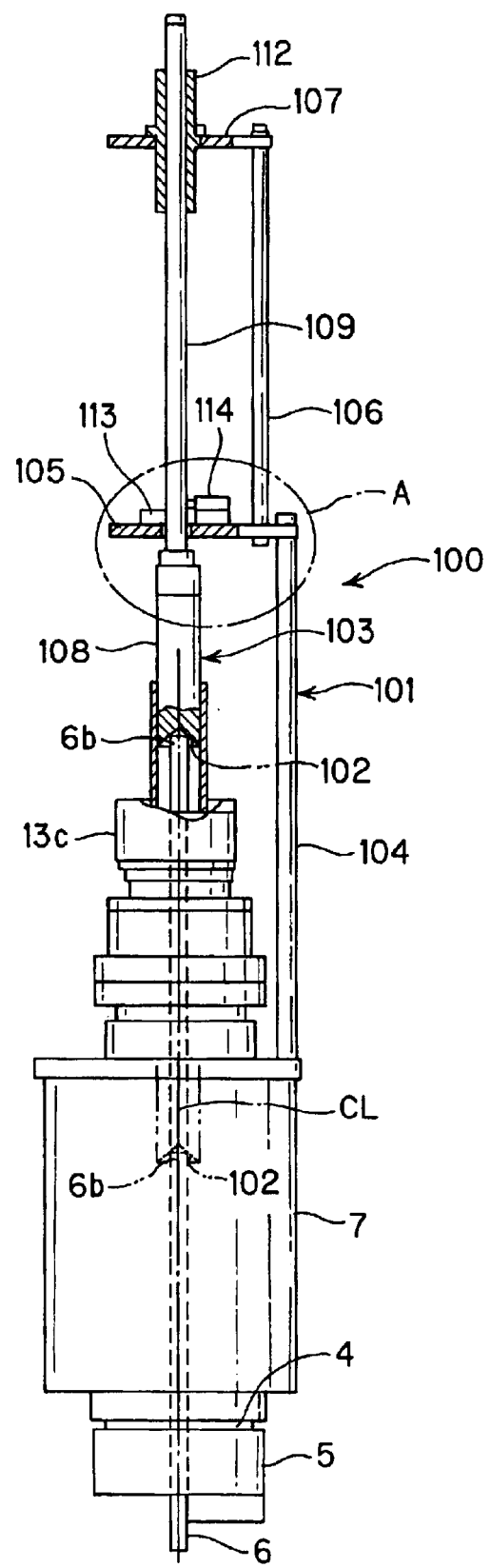
Figure 11:
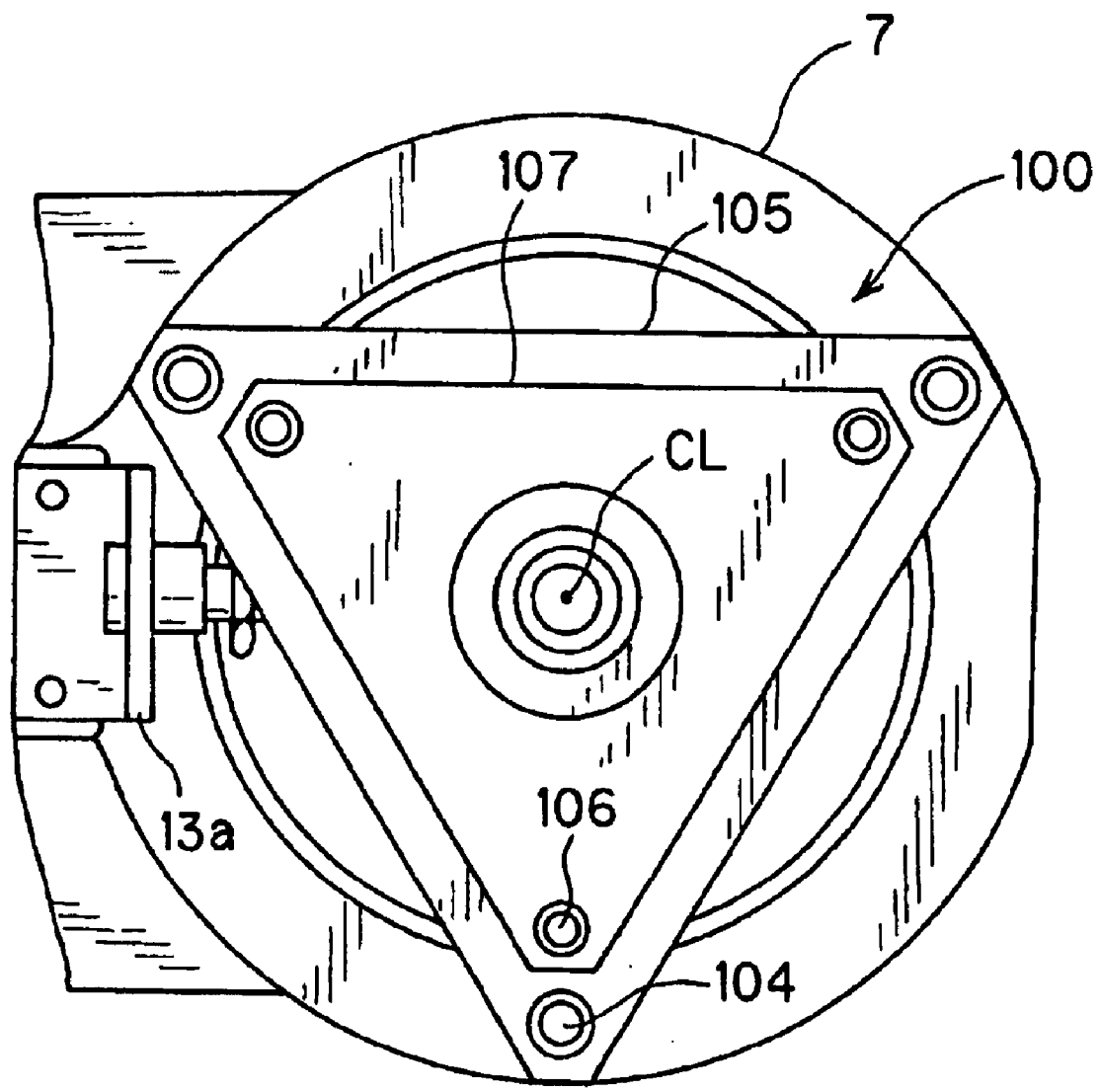
Figure 12:
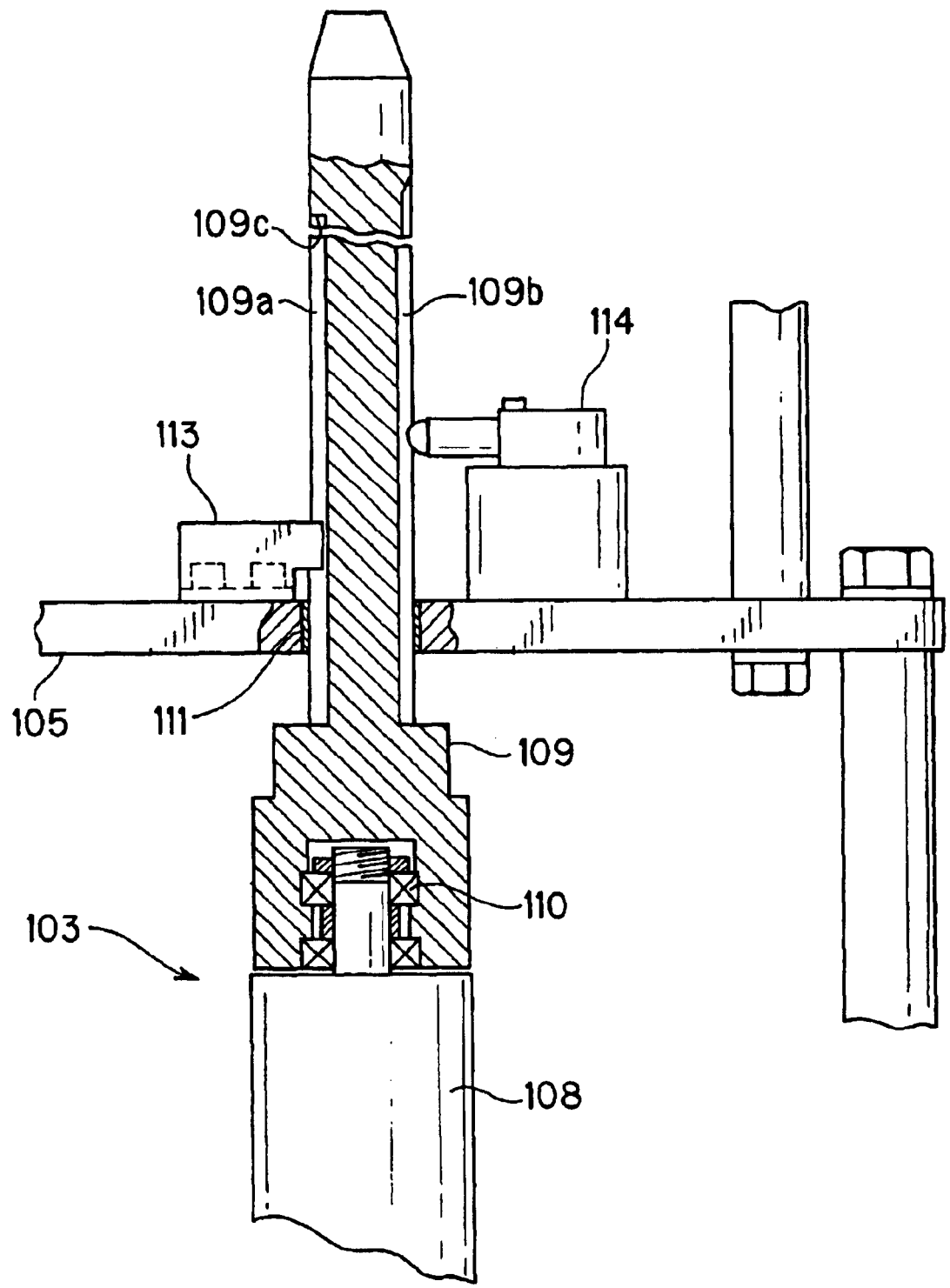
Figure 13:
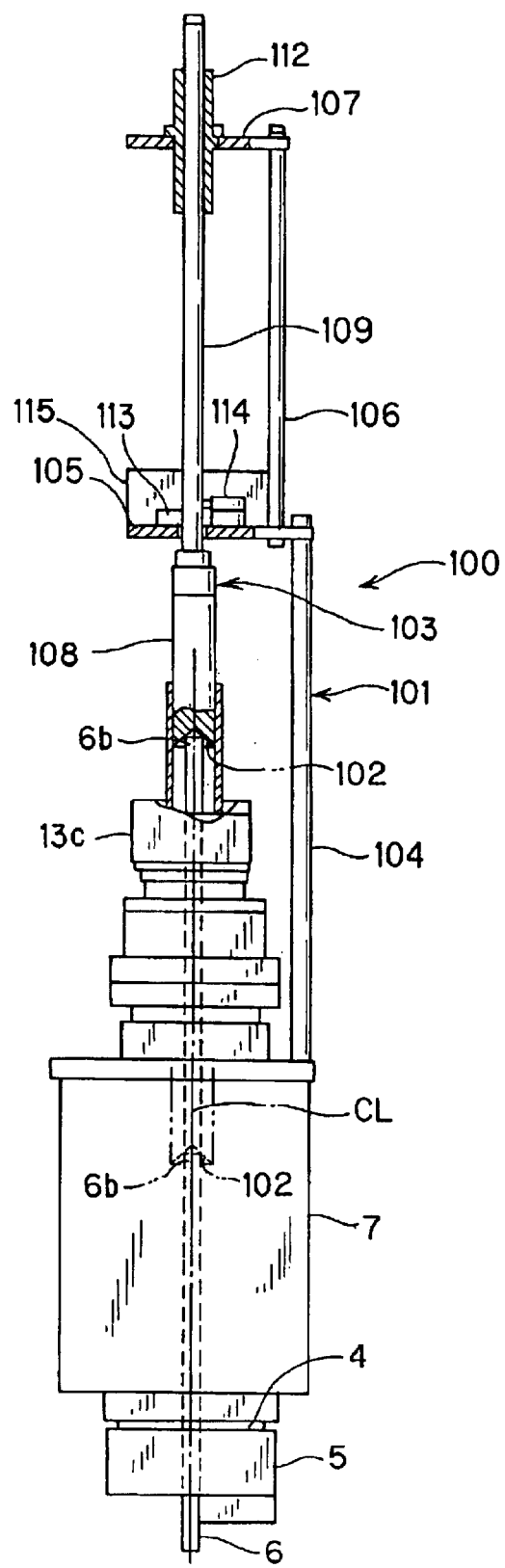
Figure 14A:
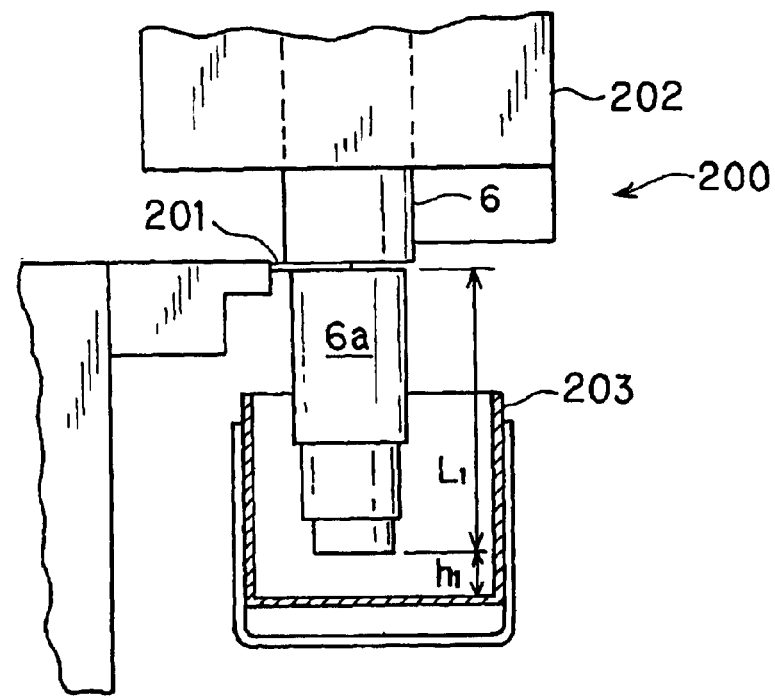
FIG. 14A and FIG. 14B are illustrations of the operation when a bar workpiece is cut off by a conventional vertical machine tool with a movable main spindle.
Figure 14B:
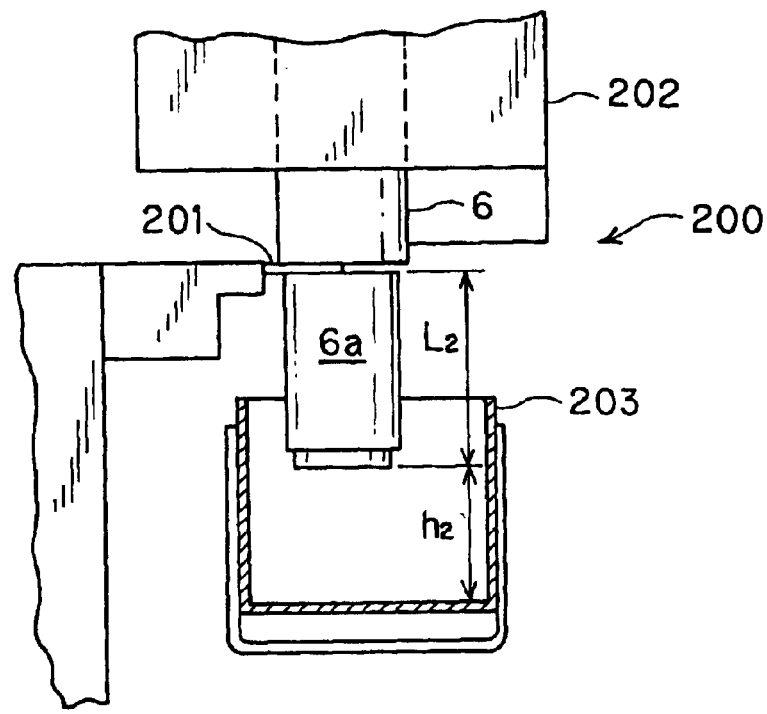

FIG. 10, FIG. 11 and FIG. 12 are a frontal cross-sectional view of the supporting means 100, a plan view thereof and an enlarged view of a portion "A" in FIG. 10, respectively. FIG. 13 is a frontal cross-sectional view of a bar workpiece supporting means according to a modification corresponding to FIG. 10.

As shown in FIG. 1 and FIGS. 10 to 20, the lathe 1 has the supporting means 100, which is provided above the headstock 7, for supporting the other end of the bar workpiece 6 inserted into the main spindle 4.

The supporting means 100 has a workpiece supporting body 101 provided on the headstock 7 and a contact member 103 provided movably in the Z-axis direction relative to the workpiece supporting body 101.

A recess portion 102 which is to be engaged with an upper end (the other end) 6b of the bar workpiece 6 inserted into the main spindle 4 is formed on a lower end of the contact member 103. The contact member 103 always depresses the bar workpiece 6 by a gravitational force of the contact member 103 and supports the bar workpiece 6.

Namely, when the turning and the cutting machining for the bar workpiece 6 progresses, an axial length of the bar workpiece 6 is gradually shortened. Then, the contact member 103 moves down by its gravitational force and at the same time, always depresses the bar workpiece 6 downwardly while keeping the engagement of the recess portion 102 with the upper end of the bar workpiece 6. Thus, the contact member 103 supports the bar workpiece 6 so that the bar workpiece 6 is not vibrated.

The bar workpiece 6 is rotated about the axis CL of the main spindle 4 under the both end supported condition in which the lower portion (one side) of the bar workpiece 6 is gripped by the chuck 5 and an upper portion of the bar workpiece 6 is always supported by the contact member 103. Accordingly, the turning and the cutting machining may be performed with high precision.

The contact member 103 supports the bar workpiece 6 by utilizing the gravitational force of the contact member 103. Therefore, it is possible to dispense with the drive means such as a cylinder unit for preventing the generation of vibration and to ensure high reliability with a simple and less expensive structure.

In the workpiece supporting body 101, three support rods 104 are arranged uniformly about the axis CL in the Z-axis direction on the upper portion of the headstock 7. Upper portions of the three support rods 104 are positioned and supported by a lower plate member 105, which is arranged in the horizontal direction and has a substantially triangular shape.

Other three support rods 106 are arranged uniformly about the axis in the Z-axis direction on the lower plate member 105. Upper portions of the three support rods 106 are positioned and supported by a substantially triangular upper plate member 107 arranged in the horizontal direction.

The contact member 103 has a rotary portion 108, having the recess portion 102 formed at the lower end thereof, and a non-rotatable portion 109. The non-rotatable portion 109 is arranged above the rotary portion 108 and is coupled with the rotary portion 108.

A bearing portion 110 is provided between the rotary portion 108 and the non-rotatable portion 109. A first groove 109a and a second groove 109b are formed in the non-rotatable portion 109.

The contact member 103 as a whole is movable in the Z-axis direction and only the rotary portion 108 is rotatable together with the bar workpiece 6. A taper is formed to the recess portion 102. Accordingly, the recess portion 102 may well engage with the upper end of the bar workpiece 6 irrespective of the magnitude of the diameter of the bar workpiece 6.

A bush 111 is mounted on a central portion of the lower plate member 105. Another bush 112 is mounted on a central portion of the upper plate member 107. A rotation limiting member 113 is mounted on the lower plate member 105 to engage with the first groove 109a, thereby preventing the non-rotatable portion 109 from rotating.

Also, an upper end portion 109c of the first groove 109a and the rotation limiting member 113 contact with each other to thereby prevent the contact member 103 from dropping down. A lower end position detecting member 114 is provided on the lower plate member 105 to detect, by the engagement with the second groove 109b, that the contact member 103 moves down to the lower end position. The non-rotatable portion 109 is free to move only in the Z-axis direction under a non-rotatable condition that the non-rotatable portion 109 is supported by the lower bush 111 and the upper bush 112.

The upper end of the bar workpiece 6 is supported by the contact member 103, of which a center position is supported with high precision by the workpiece supporting body 101, so that the bar workpiece 6 is not subjected to any vibration. Thus, the bar workpiece 6 is turned and cut with high precision under the supported condition that any vibration is not generated.

Incidentally, as in the modification shown in FIG. 13, the supporting means 100 may be provided with a drive motor 115 as a driver for driving the contact member 103. The bar workpiece 6 is always depressed by the contact member 103 driven by the drive motor 115 so that the bar workpiece 6 may be supported by the contact member 103. Namely, the contact member 103 is moved up and down by the driver such as a cylinder and the drive motor (for example, servomotor or the like) 115 and the upper end of the bar workpiece 6 may be supported without any vibration by the contact member 103.

The operation of the lathe 1 will now be described with reference to FIGS. 1 to 13.

In the beginning of the operation of the lathe 1, a plurality of the non-machined bar workpiece are received in the feed unit 14, and the bar workpiece to be machined is positioned in the bar workpiece receiving position. On the other hand, in the lathe 1, the tool rest 8 is driven and a predetermined tool 11 is indexed at the machining position. The opening and closing door 45 is kept under the closed condition, and the transfer means 2 retracts the bucket 42 to the discharging position B2.

When the operation of the lathe 1 is started, the headstock 7 moves along the moving locus in the X-axis direction and the bar workpiece 6 is inserted into the main spindle 4 at the bar workpiece receiving position. The contact member 103 of the supporting means 100 is also moved up while being depressed by the bar workpiece 6.

In the case according to the above-described modification in which the contact member 103 is moved up and down by the driving force of the driver such as the cylinder or the drive motor 115 (see FIG. 13), it is preferable to insert the bar workpiece 6 after the contact member 103 has been moved up to the upper end position.

The chuck 5 is driven by the chuck cylinder 13c and grips the bar workpiece 6 by the plurality of jaws 5a and then receives the bar workpiece 6 from the feed unit 14. The headstock 7 moves above the positioning member provided on the feed unit 14 after it has been moved upward the bar workpiece receiving position. The headstock 7 moves down to make a condition that the bar workpiece 6 is in contact with or make a predetermined gap to the top surface of the positioning member.

The headstock 7 moves up to the condition that the bar workpiece 6 projects at a predetermined length after the chuck 5 has released the bar workpiece 6. Then, the chuck 5 grips the bar workpiece 6.

The headstock 7 moves from the position for positioning the bar workpiece in the axial direction through the movement locus to the machining position after the chuck 5 has gripped the bar workpiece 6. Thus, since the headstock 7 moves also in the X-axis direction in addition to the Z-axis direction, the movement operation of the headstock 7 may exhibit the function of transferring (introducing) the bar workpiece 6.

Thereafter, the bar workpiece 6 gripped by the chuck 5 of the main spindle 4 is rotated at predetermined rotational speeds at the machining position in the machining area 13. Then, the headstock 7 moves in the Z-axis direction and in the X-axis direction relative to the tool 11 of the tool rest 8 so that the bar workpiece 6 is turned to a predetermined shape.

In the case in which the kinds of the tools 11 are changed, the desired tool 11 is indexed after the headstock 7 has moved to the retracted position. During the turning operation, the cutting fluid is supplied to the tool nose portion of the tool 11. Also, in the case in which the rotary tool may be mounted on the tool rest 8, the machining may be applied to the bar workpiece 6 by the rotary tool.

When the turning has been completed, an index driving motor is driven to index the turret 12 and to position the cut-off tool 11a at the machining position after the headstock 7 has moved to the retracted position (headstock indexing position). Thereafter, the rotary actuator 50 is driven to swing the arm 52 so that the bucket 42 is moved from the discharging position B2 to the receiving position B1.

Subsequently, the headstock 7 moves in the Z-axis direction and in the X-axis direction so that the lower portion of the bar workpiece 6 is located inside of the bucket 42 (the condition shown in FIG. 9A and FIG. 9B). Under this condition, the distance "h1" (or the distance "h2") between the lower end 43 of the bar workpiece 6 and the bottom surface 44 of the bucket 42 is set in a predetermined dimensional range.

Thereafter, the bar workpiece 6 gripped by the chuck 5 is rotated at predetermined rotational speeds and the headstock 7 moves in the X-axis direction at a predetermined height position in the Z-axis direction. Thus, the bar workpiece 6 is cut by the cut-off tool 11a.

Also during the cutting machining, the cutting fluid 87 is supplied to the tool nose portion 85 of the cut-off tool 11a by the nozzle 88. The cut-off tool 11a completely cuts the bar workpiece 6 so that a part which has been subjected to the turning becomes the machined workpiece 6a to drop down into the bucket 42. The machined workpiece 6a is cut under the condition, under which a part or a major part thereof is introduced into the bucket 42, and is directly dropped down by the gravitational force to thereby eliminate the receiving errors.

At this time, since the distance "h1" (or the distance "h2") between the lower end 43 of the machined workpiece 6a and the bottom surface 44 of the bucket 42 is kept small in the predetermined dimensional range, there is no fear that the machined workpiece 6a would be damaged.

Thus, after the machined workpiece 6a has been received in the bucket 42, the rotary actuator 50 is driven to transfer the bucket 42 from the receiving position B1 to the discharging position B2. Then, the machined workpiece 6a is guided from the bucket 42 to the chute 41a by the gravitational force of the machined workpiece 6a or the like, and is collected in the collecting box 46 through the discharge port 41.

The transfer means 2 has such a simple structure in which the arm 52 is simply operated only in the swinging motion within the machining area 13. Accordingly, the machined workpiece 6a may be received in the bucket 42 without fail at the receiving position B1. It is possible to provide the transfer means 2 in low cost and with high reliability. Also, at the discharging position B2, the bucket 42 shields the discharge port 41 without fail to thereby make it possible to prevent the chips or the cutting fluid from splashing outside of the machining area 13.

The headstock 7 moves in the Z-axis direction and in the X-axis direction and moves above the positioning member (not shown) mounted on the workpiece feed unit 7 after the bucket 42 is far from the receiving position B1.

The headstock 7 moves down so that the bar workpiece 6 is brought into contact with the positioning member or is moved down to the position with the predetermined gap. The chuck cylinder 13c is driven so that the bar workpiece 6 gripped by the jaws 5a of the chuck 5 is released.

The headstock 7 is raised up to the condition that the bar workpiece 6 projects through a predetermined length. In the same manner, the turning and the cutting machining for the bar workpiece 6 are continued after the bar workpiece 6 is gripped by the jaws 5a of the chuck 5.

In the turning and the cutting machining, the lower portion of the bar workpiece 6 is gripped by the chuck 5, and the upper portion of the bar workpiece 6 is supported by the supporting means 100. Accordingly, it is possible to perform the turning and the cutting machining with high precision.

Thus, when the turning and the cutting machining are repeated, the length of the bar workpiece 6 is shortened. Then, the headstock 7 moves from the machining position to the feed unit 14 and picks up a next bar workpiece 6 from the feed unit 14, and the same operation described above is repeated.

In the case in which the machined workpiece 6a having another dimension is to be machined, the setup work for adjusting the position of the cut-off tool 11a in the Z-axis direction is performed on the holding means 40. In this setup work, the setscrews 79 are loosened and the holder 71 is moved to the predetermined height position in an up-and-down direction. Thereafter, the setscrews 79 are fastened. Thus, since the holder 71 is positioned and held in a position relative to the base 70, the cut-off tool 11a is positioned at a predetermined height position in the Z-axis direction.

Thereafter, in the same manner as described above, the introduction of the bar workpiece 6, the turning, the cutting machining and the like are performed and the machined workpiece 6a is discharged in order by the bucket 42.

The embodiments of the present invention have been described as above but the present invention is not limited to the above-described embodiment. It is possible to make various modifications and additions within the scope of the invention.

Incidentally, the same reference numerals are used to designate the same or like members or components.

What is claimed is:

1. A vertical machine tool with a movable main spindle comprising:
   a base of said machine tool;
   the main spindle having an axis directed vertically to a floor surface and provided at a tip end with a chuck;
   a headstock, being movable at least in a first direction in parallel with the axis of said main spindle, for rotatably supporting said main spindle;
   a tool rest provided on said base and on which a single or a plurality of tools is mounted; and
   a splash guard, provided on said base, for covering a machining area of said machine tool,
   wherein said headstock or said tool rest is relatively movable in a second direction perpendicular to the first direction,
   one end of a bar workpiece, having a longer axial dimension than a radial dimension and kept to project at a predetermined length under the condition that the bar workpiece is inserted into said main spindle, is gripped by the chuck,
   said headstock and said tool of said tool rest move relative to each other to machine the bar workpiece into a predetermined shape, and a part which has been subjected to the machining is cut off as a machined workpiece in a predetermined position by a cut-off tool, and
   wherein said machine tool further comprises:
   a bar workpiece supporting means, provided above said headstock, for supporting the other end of the bar workpiece inserted into said main spindle, and
   a workpiece transfer means provided on said base and receiving the machined workpiece, which has been subjected to the cutting machining, from the chuck and transferring the machined workpiece to an outside of the machining area of said machine tool.

2. A vertical machine tool with a movable main spindle comprising:
   a base of said machine tool;
   the main spindle having an axis directed vertically to a floor surface and provided at a tip end with a chuck;
   a headstock, being movable at least in a first direction in parallel with the axis of said main spindle, for rotatably supporting said main spindle;
   a tool rest provided on said base and on which a single or a plurality of tools is mounted; and
   a splash guard, provided on said base, for covering a machining area of said machine tool,
   wherein said headstock or said tool rest is relatively movable in a second direction perpendicular to the first direction,
   a bar workpiece, having a longer axial dimension than a radial dimension and being kept to project at a predetermined length under the condition that the bar workpiece is inserted into said main spindle, is gripped by the chuck,
   said headstock and said tool of said tool rest move relative to each other to machine the bar workpiece into a predetermined shape, and a part which has been subjected to the machining is cut off as a machined workpiece in a predetermined position by a cut-off tool, and
   wherein said machine tool further comprises:
   a cut-off tool holding means, mounted on or changeably provided on said tool rest and holding said cut-off tool, for adjusting a position of said cut-off tool in the first direction for cutting the bar workpiece;
   a discharge port, provided in said splash guard, for discharging the machined workpiece to the outside of the machining area; and
   a workpiece transfer means, provided on said base and provided with a workpiece receiving member for receiving the machined workpiece from the chuck, for moving the workpiece receiving member to a receiving position for receiving from the chuck the machined workpiece having been cut off by said cut-off tool and to a discharging position corresponding to the discharge port,
   wherein the position of said cut-off tool in the first direction is adjustable by said cut-off tool holding means, so that a distance between a lower end of the bar workpiece and a bottom surface of said workpiece receiving member is kept in a predetermined dimensional range when said workpiece receiving member is located at the receiving position and said cut-off tool is cutting the bar workpiece.

3. The vertical machine tool with a movable main spindle according to claim 2, wherein a collecting box which collects the machined workpiece discharged from the discharge port is provided in a position outside of said splash guard corresponding to a position of the discharge port.

4. The vertical machine tool with a movable main spindle according to claim 2, wherein said splash guard has an opening portion and an opening and closing door for shielding the opening portion, and the discharge port is provided in the opening and closing door.

5. The vertical machine tool with a movable main spindle according to claim 3, wherein said collecting box comprises:
   an upper cover fixed on a front surface of the opening and closing door of said splash guard,
   a collecting box receiving portion movably provided on said base through a guide portion, and
   a collecting portion received detachably in said collecting box receiving portion.

6. The vertical machine tool with a movable main spindle according to claim 5,
   wherein an oil pan for receiving cutting fluid collected in said collecting box receiving portion is arranged to extend longitudinally in the second direction below said collecting box receiving portion,
   the oil pan has a dimension longer than a moving range of said collecting box receiving portion and is fixed on said base, and
   the cutting fluid within the collecting box receiving portion is collected in the oil pan even if the collecting box receiving portion is moved in any position in the second direction.

7. The vertical machine tool with a movable main spindle according to claim 2,
   wherein said workpiece receiving member is a bucket,
   the bucket is driven to be swingable by a rotary actuator and moves between the receiving position and the discharging position,
   the bucket is rotatably supported by a bucket supporting member making a swinging motion so that an opening portion of the bucket is directed upwardly at the receiving position,
   the bucket receives from the chuck the machined workpiece which has been subjected to the cutting machining at the receiving position while the bar workpiece gripped by the chuck is cut off by the cut-off tool, and
   the bucket is retracted to the discharging position during the turning by the tool, the bucket closes the discharge port at the discharging position, and the machined workpiece received in the bucket is discharged outside of the machining area through the discharge port.

8. The vertical machine tool with a movable main spindle according to claim 7,
   wherein the bucket has a predetermined shape such that the bottom surface is narrow and the opening portion is wide, a cam follower is provided to the bottom surface,
   the bucket is retained with the bottom surface located down and with the opening portion directed upwardly by the gravitational force at the receiving position, and
   at the discharging position, the cam follower is engaged with a slanted surface portion of a cam member fixed to the splash guard, and the bucket is slanted round a pivot of a supporting shaft, so that an edge portion forming the opening portion of the bucket closes the discharge port to thereby shield the machining area from the outside.

9. The vertical machine tool with a movable main spindle according to claim 2, wherein said cut-off tool holding means comprises:

a base member mounted detachably on a tool mounting portion of said tool rest or being changeable,
a holder member, mounted on said base member, for holding said cut-off tool and for adjusting a position in the first direction of said cut-off tool, and
a rotation limiting means, provided between said base member and said holder member, for preventing said holder member from rotating about its axis.

10. The vertical machine tool with a movable main spindle according to claim 9,
    wherein said base member is fixed detachably on a turret of said tool rest, a hole having a circular cross-section is formed to penetrate said base member, a key groove is formed to penetrate in the hole in parallel with the axis of said holder member,
    a cylindrical fitting portion is formed on said holder member, a key provided on said fitting portion is fitted with the key groove movably in the first direction, and
    the key groove and the key form said rotation limiting means.

11. The vertical machine tool with a movable main spindle according to claim 10,
    wherein a fixing means for fixing said holder member to a desired position in the first direction is provided to said base member and on said holder member,
    said fixing means is composed of a single or a plurality of setscrews engaged with said base member and a fitted portion formed on said fitting portion and depressed by the setscrews, and
    the setscrews are arranged in predetermined upper and lower positions and are engaged with internal screws formed to said base member so that the setscrews are easily fastened and loosened.

12. The vertical machine tool with a movable main spindle according to claim 9,
    wherein a nozzle for discharging cutting fluid in the vicinity of a tool nose portion of said cut-off tool is provided on said holder member, and
    a supply path for supplying the cutting fluid to said nozzle is formed in said holder member and said base member.

13. The vertical machine tool with a movable main spindle according to claim 1, wherein said bar workpiece supporting means comprises:
    a workpiece supporting body provided on said headstock; and
    a contact member provided movably in the first direction relative to the workpiece supporting body and provided at its lower end with a recess portion engaging with the other end of the bar workpiece inserted into said main spindle,
    wherein said contact member always depresses the bar workpiece by a gravitational force of said contact member and supports the bar workpiece.

14. The vertical machine tool with a movable main spindle according to claim 13, wherein the bar workpiece is rotated about the axis of said main spindle under the both end supported condition in which a lower portion of the bar workpiece is gripped by the chuck and an upper portion of the bar workpiece is always supported by said contact member.

15. The vertical machine tool with a movable main spindle according to claim 13,
    wherein said contact member has a rotary portion having the recess portion formed at a lower end thereof, and a non-rotatable portion arranged above said rotary portion and coupled with said rotary portion, a bearing portion is provided between said rotary portion and said non-rotatable portion, and said contact member as a whole is movable in the first direction and only said rotary portion is rotatable together with the bar workpiece.

16. The vertical machine tool with a movable main spindle according to claim 1, wherein said bar workpiece supporting means comprises:

a workpiece supporting body provided on said headstock; and a contact member provided movably in the first direction relative to the workpiece supporting body and provided at its lower end with a recess portion engaging with the other end of the bar workpiece inserted into said main spindle; and a driver for driving said contact member, wherein the bar workpiece is always depressed by said contact member, which is driven by said driver, and the bar workpiece is supported.

17. The vertical machine tool with a movable main spindle according to claim 1, wherein said headstock is also movable in the second direction.

* * * * *